US011675208B1

(12) United States Patent
Schoeche et al.

(10) Patent No.: US 11,675,208 B1
(45) Date of Patent: Jun. 13, 2023

(54) REFLECTOMETER, SPECTROPHOTOMETER, ELLIPSOMETER AND POLARIMETER SYSTEM WITH A SUPER CONTINUUM LASER SOURCE OF A BEAM OF ELECTROMAGNETISM, AND IMPROVED DETECTOR SYSTEM

(71) Applicant: J.A. WOOLLAM CO., INC, Lincoln, NE (US)

(72) Inventors: Stefan Schoeche, Lincoln, NE (US); Martin M. Liphardt, Lincoln, NE (US); Ping He, Lincoln, NE (US); Jeremy A Van Derslice, Dwight, NE (US); Craig M. Herzinger, Lincoln, NE (US); Jeffrey S. Hale, Lincoln, NE (US); Brian D. Guenther, Lincoln, NE (US); Duane E. Meyer, Lincoln, NE (US); John A Woollam, Lincoln, NE (US); James D. Welch, Omaha, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 201 days.

(21) Appl. No.: 17/300,091

(22) Filed: Mar. 5, 2021

Related U.S. Application Data

(63) Continuation-in-part of application No. 16/602,088, filed on Aug. 5, 2019, now Pat. No. 11,035,729, (Continued)

(51) Int. Cl.
*G02B 27/48* (2006.01)
*G01B 9/02* (2022.01)
*G01B 11/24* (2006.01)

(52) U.S. Cl.
CPC ......... *G02B 27/48* (2013.01); *G01B 9/02084* (2013.01); *G01B 11/24* (2013.01)

(58) Field of Classification Search
CPC ..... G02B 27/48; G01B 9/02084; G01B 11/24
(Continued)

(56) References Cited

U.S. PATENT DOCUMENTS 5,191,374 A * 3/1993 Hazama .............. G03F 7/70558
355/53
5,963,327 A 10/1999 He .......................... G01J 3/447
250/225
(Continued)

OTHER PUBLICATIONS

A New Spectrometer Using Moitipie Gratings With a Two-Dimensional Charge Coupled Diode Array Dector, Han et al, Rev.Sliinsi, vol. 24 No. 6, Jun. 2003.
(Continued)

*Primary Examiner* — Tarifur R Chowdhury
*Assistant Examiner* — Omar H Nixon
(74) *Attorney, Agent, or Firm* — James D. Welch

(57) ABSTRACT

Reflectometer, spectrophotometer, ellipsometer, and polarimeter systems having a supercontinuum laser source of coherent electromagnetic radiation over a range of between 400 nm to between 4400 nm and 18000 nm, and another source of wavelengths to provide between 400 nm and as high as at least 50000 nm; a stage for supporting a sample and a detector of electromagnetic radiation, wherein the source provides a beam of electromagnetic radiation which interacts with a sample and enters a detector system optionally incorporating a wavelength modifier, where the detector system can be functionally incorporated with combinations of gratings and/or combination dichroic beam splitter-prisms, which can be optimized as regards wavelength dispersion characteristics to direct wavelengths in various
(Continued)

ranges to various detectors that are well suited to detect them.

42 Claims, 11 Drawing Sheets

Related U.S. Application Data which is a continuation-in-part of application No. 16/350,017, filed on Sep. 12, 2018, now Pat. No. 10,422,739, which is a continuation-in-part of application No. 15/330,430, filed on Sep. 20, 2016, now Pat. No. 10,132,684, said application No. 16/602,088 is a continuation-in-part of application No. 15/330,430, filed on Sep. 20, 2016, now Pat. No. 10,132,684, which is a continuation-in-part of application No. 14/757,280, filed on Dec. 14, 2015, now Pat. No. 10,247,611.

(60) Provisional application No. 63/143,187, filed on Jan. 29, 2021, provisional application No. 62/284,441, filed on Sep. 30, 2015, provisional application No. 62/124,428, filed on Dec. 18, 2014.

(58) Field of Classification Search
USPC .......................................................... 356/326
See application file for complete search history.

(56) References Cited

U.S. PATENT DOCUMENTS

| | | | |
|---|---|---|---|
| 6,104,488 A | 8/2000 | LeVan | |
| 6,895,149 B1 | 5/2005 | Jacob et al. | |
| 7,345,762 B1 | 3/2008 | Liphardt et al. | |
| 7,522,331 B2 | 4/2009 | Lapchuk et al. | |
| 7,570,358 B2 | 8/2009 | Den Boef | |
| 7,928,390 B1 | 4/2011 | Zhuang et al. | G01J 5/02 250/339.08 |
| 8,031,337 B2 | 10/2011 | Den Boef | |
| 8,169,611 B2 | 5/2012 | Herzinger et al. | |
| 8,253,940 B1* | 8/2012 | Green | G01N 21/211 356/369 |
| 8,422,519 B2 | 4/2013 | Knight et al. | |
| 8,441,639 B2 | 5/2013 | Kandel et al. | |
| 8,718,104 B2 | 5/2014 | Clowes et al. | |
| 8,873,054 B2 | 10/2014 | Kandel et al. | |
| 9,080,971 B2 | 7/2015 | Kandel et al. | |
| 2004/0064149 A1* | 4/2004 | Doern | A61B 5/68 606/130 |
| 2006/0238743 A1 | 10/2006 | Lizotte et al. | |
| 2008/0117413 A1 | 5/2008 | Liphardt | G01N 21/211 356/73 |
| 2008/0239265 A1 | 10/2008 | Den Boef | |
| 2008/0279442 A1 | 11/2008 | Den Boef | G03F 1/84 382/144 |
| 2009/0080709 A1* | 3/2009 | Rowe | G06V 10/56 382/115 |
| 2009/0262366 A1 | 10/2009 | Den Boef | |
| 2010/0031414 A1 | 2/2010 | Millet | G03F 1/84 382/144 |
| 2011/0069312 A1 | 3/2011 | Kandel et al. | |
| 2011/0109906 A1 | 5/2011 | Liphardt | G01N 21/01 356/400 |
| 2012/0057158 A1 | 3/2012 | Hilfiker | G01N 21/211 356/369 |
| 2012/0170021 A1* | 7/2012 | Walsh | G01N 21/41 356/51 |
| 2013/0010365 A1 | 1/2013 | Curtis | |
| 2013/0027673 A1 | 1/2013 | Moussa | |
| 2013/0182263 A1 | 7/2013 | Shchegrov | G01B 9/02 356/512 |
| 2013/0222795 A1 | 8/2013 | Madsen | G01B 11/0625 356/237.5 |
| 2014/0233091 A1 | 8/2014 | Clowes et al. | |
| 2015/0036142 A1 | 2/2015 | Kandel et al. | |
| 2015/0046118 A1 | 2/2015 | Pandev | |
| 2015/0046121 A1 | 2/2015 | Dziura | |
| 2015/0058813 A1 | 2/2015 | Kim | |
| 2015/0323316 A1 | 11/2015 | Shchegrov et al. | |
| 2015/0330770 A1 | 11/2015 | Poslavsky | |
| 2020/0240907 A1 | 7/2020 | Wang et al. | |

OTHER PUBLICATIONS

Optotune Data Sheet—Electroactive Polymer and Relvctance Force LSR.
NLIR Mid-Infrared Light Detector Data Sheet.
CLPF-2500-SLIDFG Series, FemToseund Ultrabroadbewel UIS-To-IR Source, IPG Data Sheet.
Spectra Chrome 1000, Mid-IR Super Continuum Laser; ND Photonics Data Sheet.

* cited by examiner

Speckle reduction measured with a CCD camera

Speckle reduction measured with a CCD camera

REFLECTOMETER, SPECTROPHOTOMETER, ELLIPSOMETER AND POLARIMETER SYSTEM WITH A SUPER CONTINUUM LASER SOURCE OF A BEAM OF ELECTROMAGNETISM, AND IMPROVED DETECTOR SYSTEM This Application is a CIP of application Ser. No. 16/602,088 Filed Aug. 5, 2019, which is a CIP of Ser. No. 16/350,017 Filed Sep. 12, 2018, and therevia of Ser. No. 15/330,430 Filed Sep. 20, 2016 and therevia Claims benefit of Provisional 62/844,441 Filed Sep. 30, 2016, and is also a CIP of Ser. No. 14/757,280 Filed Dec. 14, 2015, and therevia Claims Benefit of Provisional Application Ser. No. 62/124,428, filed Dec. 18, 2014, and further directly Claims Benefit of Application Ser. No. 62/284,441 filed Sep. 30, 2015. This Application also Claims Benefit of Provisional Application 63/143,187 Filed Jan. 29, 2021.

TECHNICAL FIELD

The present invention relates to sample investigation systems that utilize electromagnetic radiation, and more particularly to reflectometer, spectrophotometer, ellipsometer, and polarimeter systems comprising a supercontinuum laser source of electromagnetic radiation, a stage for supporting a sample and a detector of electromagnetic radiation over a range of at least 400-4400 nm. The present invention is distinguished in that it applies a beam of high intensity, highly directional electromagnetic radiation provided by said supercontinuum laser, and applies detector systems that direct wavelengths in various ranges with various detectors that can be optimized to detect them.

BACKGROUND

The use of electromagnetic radiation to investigate samples is well known. Reflectometer, spectrophotometer, ellipsometer, and polarimeter systems, for instance, direct a beam of electromagnetic radiation to interact therewith, (in reflection and/or transmission), a sample, which beam then enters a detector. Detected changes in Intensity (in reflectometer and spectrophotometer systems), and Polarization State (in ellipsometer, and polarimeter systems), as a result of said interaction provide insight to properties of the sample. Properties such as absorption constant, ellipsometric Psi and Delta etc. are evaluated, typically by performing a mathematical regression of accumulated data onto a mathematical model of the sample.

It is always of benefit to investigate a sample with multiple angles-of-incidence of the beam to a sample surface, and with as many wavelengths as possible. In the later is found a major innovation of the present invention which identifies and applies as a source of a beam of electromagnetic radiation a supercontinuum laser. Briefly, as described in an Article titled "Supercontinuum", said terminology "supercontinuum laser" refers to a source of electromagnetic radiation that results from interaction of a typically pulsed laser and many non-linear processes to cause extensive spectral broadening. (Note, "extensive" means beyond a single wavelength, and in the present invention it can be interpreted to mean a spectrum between about 400 to at least 4400 nm. Non-linear processes include self-phase modulation, four-wave mixing, soliton dynamics and cross-phase modulation. (The term "soliton" refers to relatively permanent localized waveforms that are formed from dispersion and non-linearity effects. For instance, the refractive index of a material at a given frequency depends on the amplitude of electromagnetic radiation applied, (ie. the non-linear Kerr effect). If a pulse has the right shape said Kerr effect will exactly cancel dispersion in the material and the pulse's shape will not change over time, thereby forming a "soliton". Also, the term "four-wave mixing" refers to the effect wherein interaction between two or three wavelengths produces additional new wavelengths, (eg. a non-linear interaction of two different wavelength beams affect a third wavelength beam such that a fourth wavelength beam is generated). Continuing, said "Supercontinuum" article provides that the two most important regimes are soliton fusion and modulation instability, and that a third regime involves pumping in the normal, (ie. refractive index decreases with increase in wavelength), dispersion region. Soliton fusion involves application of a high powered femto-second pulse being launched into highly non-linear photonic crystal, or other highly non-linear fiber, where the femto-second pulse can be considered a high order soliton which rapidly broadens and then fissions into fundamental solitons. The resulting fundamental solitons then undergo intra-Raman scattering and shift to longer wavelengths, (known as soliton self-frequency shift), which generates a long wavelength side of a continuum. A shorter wavelength side of a continuum is formed when longer soliton self frequencies as dictated by group velocity matching conditions via a soliton trapping mechanism. This approach to producing a supercontinuum is characterized by the production of high temporal coherence. A disadvantage of this approach is that high average powers in the produced continuum are not achievable. The modulation instability regime involves the breakup of a continuous or quasi-continuous wave field. The long-wavelength side of the continuum formed in this regime is generated by intra-pulse Raman scattering and self frequency sifting. The short wavelength side is generally attributed to soliton fission and dispersive wave generation. The normal dispersion range pumping approach, where pulses are short enough, is attributed to self-modulation which can lead to significant broadening which is temporarily coherent. Where pulses are not ultra-short then stimulated Raman scattering tends to dominate and typically a series of cascaded discrete Stokes lines will appear until the zero dispersion wavelength is reached. At this point a soliton Raman continuum can form. Pumping in the anamolous range is more efficient for continuum generation. For insight it is noted that the normal pumping range dispersion is that in which an increase in wavelength leads to a decrease in refractive index. This relationship is the opposite in the anamolous range. For an increase in wavelength the refractive index increases. For additional insight, Raman scattering of photons is inelastic, and mediated by an exciton. Only 1 in about 10 million photons that are scattered from a molecule or atom are scattered by the inelastic Raman effect, but those that are present at a different frequency than was the initial photon, and the wavelength of the scattered photon is usually longer, therefore the scattering molecule, for instance, can be excited to a higher energy level by the interaction.

While the formation of a supercontinuum laser spectrum is the result of many complex non-linear effects, such need not concern us as regards the present invention which is not dependent on how a supercontinuum is produced, only that it is and is applied in such as a reflectometer, spectrophotometer, ellipsometer or polarimeter.

An additional effect that must also be considered is the result of coherence that results in a supercontinuum range of wavelengths. When coherence is present it is very well known that interference effects result based on differences in phase between interacting waves. When lasers are involved the effects of interference is often referred to as "Speckle" and importantly this leads to time varying beam profiles. To be conveniently applied in a system such as a reflectometer, spectrophotometer, ellipsometer or polarimeter the complexity entered by such spatial and temporal fluctuations must be reduced. The present invention therefore applies speckle reducers, such as Optotune Elastoactive Polymer and Reflective Force LSR's.

Turning now to Identified Patent literature that has relevance regarding Supercontinuum Laser Sources, the following were identified:

U.S. Pat. No. 8,422,519 to Knight et al.;
U.S. Pat. No. 8,718,104 to Clowes et al.; and
Published App. No. 2014/0233091 by Clowes et al.

The present invention also involves application of improved detector systems. In that light, it is emphasized that it is well known to apply detectors of electromagnetic radiation in, for instance, ellipsometry. And it is known to use beam splitters to direct portions of beams into different detectors which can be optimized to respond to different wavelength ranges. A Patent to Herzinger et al. U.S. Pat. No. 8,169,611, for instance shows such an arrangement in FIG. 1a thereof. Many other references showing similar application of beam splitters in a similar manner exist. Also known are monochromater systems that utilizes a sequence of gratings with which a beam of spectroscopic electromagnetic radiation sequentially interacts to select a desired wavelength. FIG. 9 in a Patent to Liphardt et al. U.S. Pat. No. 7,345,762 provides an example that shows such an arrangement, and FIG. 2 in said Patent 762 also demonstrates an ellipsometer or polarimeter system.

Another known Patent is U.S. Pat. No. 6,104,488 to LeVan. This Patent is focused on providing high single grating efficiency, with different orders of wavelengths being produced thereby detected by a single detector.

An article titled "A New Spectrometer Using Multiple Gratings With A Two-Dimensional Charge-Coupled Diode Array Detector", Review of Scientific Instruments, Han et al., Vol. 74, No. 6, June 2003, describes a special grating that consists of three laterally stacked sub-gratings to generate three wavelength ranges.

Additional Patent references identified in a computer Search are:

Searching for (Supercontinuum Laser and Ellipsometer) provided five Patents, U.S. Pat. Nos. 9,080,971, 8,873, 054, 8,441,639, 8,031,337 and 7,570,358, and six Published Applications, No. 2015/0323316, 2015/0036142, 2013/0222795, 2011/0069312, 2009/0262366 and 2008/0239265; and Searching of (Supercontinuum & Laser and Ellipsometer and Speckle) provided no Patents and only four Published Applications, Nos. 2015/0058813, 2015/0046121, 2015/0046118 and 2015/0330770.

Also, known Patents and Published Applications relating to Speckle Reduction are: U.S. Pat. No. 6,895,149 to Jacob et al.; U.S. Pat. No. 7,522,331 to Lapchuk et al.; US 2013/0027673 by Moussa; US 2006/0238743 by Lizotte et al. and US 2013/0010365 by Curtis.

Further, in prosecution of Parent application Ser. No. 14/757,280 the Examiner identified:

| | |
|---|---|
| Hilfiker et al. | US2012/0057158; |
| Herzinger | US2013/0026368; |

-continued

| | |
|---|---|
| Pandev | US2013/0304408; |
| Ostermeyer | US2013/0268336; |
| Johs | US2015/0219497; |
| Moriva et al. | US2009/0267003; |
| Grejeda | US2014/0304963; |
| Yamaguchi et al. | US2013/0063700. |

In particular the Pandev 408 reference is relevant in that it mentions, in passing, use of a Supercontinuum Laser Source as an example of a source of electromagnetic radiation. However, that use is in a pathway that directs a beam produced thereby to interact with both a Beam Splitter and an Objective Lens prior to interacting with a Sample. While Pandev 408 suggests possible application of a Supercontinuum Laser Source as just described, it does not suggest application in a pathway which approaches a Sample at an oblique Angle-of-Incidence and which does not pass through a Beam Splitter and an Objective Lens along the way. This is important as had Pandev 408 intended such an application it seems it would have mentioned it. This is because Pandev 408 includes a Beam from a separate Source, labeled, (102) in Pandev 408), which does involve a Beam approaching a Sample (201) at an Oblique Angle-of-Incidence. No suggestion that the Illuminator (102) should be a Supercontinuum Laser (202) is present in Pandev 408, however. Had it been intended that Illuminator (102) be a Supercontinuum Laser (202), Pandev 408 should have mentioned it! It is emphasized at this point, that the Present Invention involves a an Electromagnetic Beam approaching a Sample at an Oblique Angle-of-Incidence, which Beam does not pass through combination of a Beam Splitter and an Objective Lens, in that order. Pandev is incorporated by reference herein.

A Published Patent Application No. US2010/0031414 to Lippert et al. is identified as the Examiner, in prosecuting Parent application Ser. No. 16/350,017 by Van Derslice et al. cited it in rejection Claims. Said Lippert et al. 414 reference is to a Microscope having selective illumination of a plane. To the extent necessary to avoid said Pandev 408 and Lippert et al. 414 references, said sample investigation system as Claimed in the present Application are characterized by at least one negative limitation selected from the group consisting of:

the wavelength range of the highly directional coherent spectrum of electromagnetic radiation wavelengths is greater than about 1000 nm;

in use, said source of a spectroscopic beam of electromagnetic radiation directs a beam provided thereby to a sample placed on said stage for supporting a sample, at an angle thereto, but does not involve said beam passing through a combination beam splitter and objective lens, in that order;

in use, fluorescence caused to occur by an illumination beam of electromagnetic radiation is not detected by a detector for spatially resolving radiation emitted by an object to be examined; and in use, an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined;

in use, an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined.

Applicants believe that Pandev 408 and Lippert et al. 414 cannot be read to obviate a present invention Claim to a sample investigation system as Claimed herein, which Claim includes said negative limitations.

Another recently identified Patent is also important to discuss, that being U.S. Pat. No. 7,928,390 to Zhuang et al. Said Patent, discloses systems for use in Infrared Metrology which utilize a Supercontinuum Source comprised of a Supercontinuum Source comprised of a pulsed laser adapted to pump into a photonic crystal fiber made from chalogenide glasses as a substantial element; or from a pumping CO2 laser adapted to fire into a photonic crystal fiber formed in part from at least one selection from the group of: AlClxBr (1-x), NaCl and ZnSe; or a system comprising a Titanium: Saphire laser adapted to fire femtosecond pulses through a non-linear optical element disposed in an inert gas in a gas containment cell, such that a second harmonic pulse is produced and generates supercontinuum terahertz radiation. This reference is further removed from the Claims herein by Negative Limitation, and is incorporated by reference herein.

It is noted as well that the Herzinger 368 and Hilfiker et al. 158 references were cited in the prosecution of Parent application Ser. No. 14/756,345 as serving to show sources of electromagnetic radiation which provide wavelengths in a range overlapping that of a Supercontinuum Laser, are sufficient as references against said 345 Parent Application as regards System Claims. The 345 Application however, did not provide support for a negative limitation regarding a combination Beam Splitter and Objective Lens, (elements (205) and (206) in Pandev 408, respectively, in Claims, hence necessitating the present CIP which provides the required support. Further, it is noted that Herzinger 368 specifically listed Sources for use in the invention, and gave no incentive to one skilled in the art to seek out other Sources. Hilfiker et al. 158 did not so list Sources, and shows a range of 200-1000 nm as exemplary in its FIGS. 6c-6e. This range overlaps that of about 400 to at least 4400 nm as recited in the present Application, and in the Parent application Ser. No. 15/330,430. The Examiner, in the 430 Application Prosecution cited Hilfiker et al. 158 as valid art against, because of the wavelength range overlap in view of In re Wertheim 541 F.2d 257m 191 USPQ 90 (CCPA 1976) 2144.05(i). As a precaution, it is stated that the Present Claims can be amended to cover only a limited range of wavelengths of between—more than 1000 to at least 4400 nm, if necessary. However, in view of the negative limitation in the Present claim 1, regarding a combination Beam Splitter and Objective Lens, (elements (205) and (206) in Pandev 408, this is believed unnecessary. Applicant reserves the right to recite any other reduced wavelength range should that be necessary to avoid a presently un-cited reference. Again, it is believed Pandev 408 and Lippert et al. 414 are removed as references by inclusion of negative limitations in the Claims herein, and those are references cited that even suggests use of a supercontinuum laser that provides a high intensity, highly directional coherent spectrum of electromagnetic radiation wavelengths within a range of about 400 to at least 4400 nm, that results from interaction of a pulsed laser and non-linear processes to cause extensive spectral broadening. It is also noted that a major teaching in the Examiner's base Reference, Hilfiker et al. No. 2012/0057158, is that Intensity must often be greatly reduced in practice to obtain any worthwhile data from a Textured Sample. Even when using Conventional Sources of Electromagnetic Radiation in a System and Method of Hilfiker et al. 158, it is often necessary to work to reduce Beam Intensity. Hilfiker et al. 158 therefore does not remotely suggest seeking out Sources that provide increased Intensity such as Super Continuum Lasers! That would be self defeating in the context of Hilfiker et al 158 and Hilfiker et al. 158 therefore impliedly teaches against doing so! While Para. 0003 might seem to indicate that because beam scattering by a Textured Surface causes less intensity (see FIG. 3a) to be provided specularly to a detector, that a higher intensity beam would be beneficial in the invention thereof. However, in practice this is not the case. Hilfiker et al. 158 makes clear that the approach to overcoming the problem of low beam intensity at a detector is to increase the amount of specularly reflected intensity, hence reducing scattered components. Increasing intensity would generally increase scattered components far more than specularly reflected components, (see Para. 261). Increasing intensity at a detector in Hilfiker et al. 158 is achieved, not by increasing incident beam intensity, but rather by orienting a Textured Sample so that facets thereon specularly reflect an incident beam toward a detector. This is really the only way to provide good information containing input to the detector! FIGS. 3b, 4a, 4c and 5d provide insight to how this is accomplished. In fact, when investigating Textured Samples (the focus in Hilfiker et al. 158) it is more often the case that, when a Sample is properly oriented to enable investigation thereof, that beam Intensity exiting a Sample is so high that it saturates a detector. Note that the Hilfiker et al. 158 invention therefore includes Intensity Control elements (eg. Crossed Polarizers) identified as (VA) for Variable Attenuation in the path of an incident beam. See FIG. 1 for example. It most often occurs that when facets on a sample are properly oriented to specularly reflect electromagnetic beam components directly to a detector, the intensity present saturates said detector and the variable attenuator (VA) must be applied decrease intensity of the incident beam. This is a very important point as it indicates that Hilfiker et al. 158 very definitely teaches away from the present invention of providing higher intensity sources. Providing a higher intensity beam in the Hilfiker et al. 158 system would require more efficient intensity attenuation capability and complicate practice of the methodology involved. That is, a higher intensity source (eg. a Supercontinuum Laser) in a Hilfiker et al. 158 system would make practice of the Methodology taught therein more difficult if not, in some cases, impossible.

The Examiner, in prosecution of the Parent application Ser. No. 16/350,017 also cites a Published Application by Ostermeyer et al. No. US 2013/0258336, to provide Speckle Reducing elements admittedly not present in Hilfiker et al. 158 and Lippert et al. 414. It is pointed out that nothing Hilfiker et al. 158 and Lippert et al. 414 would lead one skilled in the art to seek out such elements. There is no mention of Supercontinuum Lasers in Hilfiker et al 158, and Lippert et al. 336 does so only in passing in Paragraph 0039 thereof. Lippert et al. 336 does not mention that Speckle is a problem when using Supercontinuum Lasers, hence one skilled in the art having Lippert et al 414 before him or her would not be guided thereby to seek out any reference what-so-ever that considers Speckle. The Examiner also cited Moriya et al. US 2009/0267003 and Greida et al. US 2014/0304963 as regards the provision of Speckle Reducing elements, but again, nothing in Lippert et al. 414 would lead one skilled in the art to seek that out. It is felt unnecessary to consider Ostermeyer et al. 336, Moriya et al. 003 and Greida et al. 963 further as Lippert et al. 414 is believed overcome by Negative Limitations in the Claims.

Another relevant reference is a Published Application by Islam, No. 2014/0183363 (incorporated by reference herein) discloses more than one Detector and "Sample" as present. Different Detectors (1808) and (1809) receive electromagnetic radiation from both a Sample 1806 per se., and a Reference (1807), as exemplified in FIG. 18 thereof.

Wang, US2020/0240907 is also incorporated by reference.

Even in view of the state of the art, there remains need for application of improved sources of electromagnetic radiation and detector systems in reflectometer, spectrophotometer, ellipsometer, and polarimeter systems. Further, there remains need for additional systems directed to optimizing application of a plurality of detectors and/or wavelength dispersing elements which are arranged sequentially, and wherein each follow-on wavelength dispersing element receives a reflected altered spectral content reflected beam of electromagnetic radiation from a preceding wavelength dispersing element, and wherein each wavelength dispersing element produces at least one + or − spectrum of dispersed wavelengths which are directed toward a related detector. In particular there remains need for improved Sample Investigation Systems and Methodology which results from various Utility providing combinations of:
- the application of systems of detectors in combinations that can be optimized for use in various ranges of electromagnetic radiation;
- the use of a supercontinuum laser for providing a beam of coherent electromagnetic radiation over a wavelength range of at least 400-4400 nm, possibly in combination with other sources of electromagnetic radiation over extended wavelength ranges;
- the application of a speckle reducer with super continuum laser sources to effectively provide a more consistent Intensity vs. Position in a beam of electromagnetic radiation derived from the supercontinuum laser output in Ellipsometers, Relectometers, Spectrophotometers and the like systems;
- the application of additional sources of electromagnetic radiation in combination with, or in substitution for supercontinuum lasers, to expand the wavelength range over which a present invention Sample Investigation System can be used, (eg. a Nernst Glower (14000 nm) or Globar (50000 nm) source which can comprise wavelengths beyond a selected Supercontinuum laser source;
- the application of a supercontinuum lasers in Fourier transform infrared sources by the combining thereof with a Michelson Interferometers, which it is believed has not been previously disclosed in the context of application in Ellipsometer, Reflectometer, Spectrophotometer and the like systems;
- the application of Wavelength Modifiers which receive relatively longer wavelength electromagnetic radiation (eg. in the Infrared (IR) and Terahertz (THZ) ranges) which Solid State Detector Elements cannot detect, and providing relatively shorter wavelength electromagnetic radiation which Solid State Detector Elements can detect.

The present invention also includes Wavelength Modifiers which accept relatively short wavelengths and provide relatively longer wavelengths as output.

It is believed that such wavelength modifiers have not previously been applied in Reflectometers, Spectrophotometers, Ellipsometer and Polarimeters.

There remains need for Reflectometers, Spectrophotometers, Ellipsometer and Polarimeters which can operate with sources of wavelengths between about 400 nm and upwards of at least 50000 nm, with special attention being to application of Supercontinuum lasers which provide high intensity in typical wavelength ranges of comprising from 400 nm to 4400 nm, and as and presently even a high as 18000 nm, though intensity might be less than for some other type sources at the longer wavelengths.

DISCLOSURE OF THE INVENTION

To begin, it must be understood that, as in Parent application Ser. No. 16/602,088, the Present Invention Sample Investigation System, and Methods of Use are comprised of, and derived from various combinations in at least three different sub-invention areas, these being:
- application of systems of detectors in combinations that can be optimized for use in various ranges of electromagnetic radiation wavelengths;
- use of a supercontinuum laser for providing a beam of coherent electromagnetic radiation over a wavelength range of at least 400-4400 nm, possibly in combination with other sources of electromagnetic radiation over extended wavelength ranges; and
- application of a speckle reducer with supercontinuum laser sources to effectively provide a more consistent Intensity vs. Position in a beam of electromagnetic radiation derived from the supercontinuum laser output in Ellipsometers, Reflectometers, Spectrophotometers and the like systems.

The Presently disclosed Invention is, however, further comprised from additional sub-invention areas, namely:
- application of supercontinuum lasers source that provide wavelengths up to about 18000 nm;
- application of additional types of sources of electromagnetic radiation in combination with, or in substitution for supercontinuum lasers, to expand the wavelength range over which a present invention Sample Investigation System can be used, (eg. Nernst Glower and Globar and other Sources which can provide wavelengths up to between 14000 nm and 50000 nm, respectively, or other possible sources which include DTHS; Laser stabilized Arc Lamps, Hg Arc Lamps, Fixed or Tunable Quantum Cascade Lasers, QTH and Xe lamps, laser stabilized arc lamps, other laser driven source);
- application of a supercontinuum lasers in Fourier transform infrared sources by the combining thereof with a Michelson Interferometers, which it is believed has not been previously disclosed in the context of application in Ellipsometer, Reflectometer, Spectrophotometer and the like systems in combination with other distinguishing factors;
- application of Wavelength Modifiers which receive relatively longer wavelength electromagnetic radiation (eg. in the Infrared (IR) and Terahertz (THZ) ranges) which, for instance, Solid State Detector Elements cannot detect, and providing relatively shorter wavelength electromagnetic radiation which, for instance, Solid State (or other type) Detector Elements can detect;

application of Wavelength Modifiers which receive relatively shorter wavelength electromagnetic radiation which Golay Cell, Bolometer, Micro-Bolometer a thermocouple; photoconductive material; photoconductive material; Deuterated Triglycine Sulfate (DTGS); HgCdTe (MCT); LiTaO3; PbSe; PbS; and InSb; etc. detectors can have a problem detecting, and providing relatively longer wavelength electromagnetic radiation which they can detect.

Said present invention sub-categories, in various combinations are believed provide new, novel and non-obvious Sample Investigation Systems and enable new, non-obvious and useful Methods of Use thereof.

The Intensity of a beam of electromagnetic radiation from a supercontinuum laser is generally much higher over a larger range of wavelengths than is the case from other sources of electromagnetic radiation conventionally used in ellipsometric and the like applications. As the present invention system of detectors can provide optimized detection of electromagnetic radiation in specific ranges of wavelengths (including modified wavelengths produced by wavelength modifiers—usually from longer to shorter, but can be from shorter to longer wavelengths), the present invention provides utility in the form of allowing a user thereof to conveniently investigate samples over a large range of wavelengths without the necessity of reconfiguring the system with different sources and detectors of electromagnetic radiation. However, other known sources provide wavelengths longer than can be currently produced by supercontinuum lasers, but will certainly be produced by improved supercontinuum lasers in the future, hence, the present invention also comprises use thereof when necessary to enable sample investigation at longer wavelengths, until improved supercontinuum lasers become available. It is noted that an increase in wavelength range from about 400-2500 nm about five years ago, supercontinuum lasers available presently provide wavelengths up to at least 4400 nm. For instance NP Photonics SpectraChrome 1000 Mid-IR Supercontinuum Lasers. It is also noted that Supercontinuum Lasers that provide wavelengths up to about 18000 nm are available, although Intensity of the wavelengths drops with at the longest wavelengths. A Source from IPG Photonics (CLPF-2500-SC IDFG Series) shows a Plot out to 18 Microns for instance. Many such Sources however, extend only to about 5000 nm at most. The present invention is to be considered to encompass any such a possible Supercontinuum Laser wavelength range.

Sample Investigation Systems

With the foregoing in mind, the present invention can first be described as a sample investigation system selected from the group consisting of:
   a reflectometer;
   a spectrophotometer;
   an ellipsometer; and
   a polarimeter;
comprising:
   a) a source of a spectroscopic beam of electromagnetic radiation;
   b) a stage for supporting a sample; and
   c) a detector system for monitoring electromagnetic radiation provided from a single sample.
Said system is distinguished in that:
said source of a spectroscopic beam of electromagnetic radiation is a supercontinuum laser that provides a high intensity, highly directional coherent spectrum of electromagnetic radiation wavelengths within a range comprising 400 to at least 4400 nm, that results from interaction of a pulsed laser and non-linear processes to cause extensive spectral broadening;
and in that said sample investigation system is characterized by at least one selection from the group consisting of:
   in use, said source of a spectroscopic beam of electromagnetic radiation directs a beam provided thereby to a sample placed on said stage for supporting a sample, at an angle thereto, but does not involve said beam passing through a combination beam splitter and objective lens, in that order;
   in use, fluoresence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light diverging from θ degrees to a section plane of the light sheet and of the object to be examined; and
   in use said system does not utilize a supercontinuum source comprised of a pulsed laser adapted to pump into a photonic crystal fiber made from chalogenide glasses as a substantial element; or from a pumping CO2 laser adapted to fire into a photonic crystal fiber formed in part from at least one selection from the group of: AlClxBr(1-x), NaCl and ZnSe; or a system comprising a Titanium:Saphire laser adapted to fire femtosecond pulses through a non-linear optical element disposed in an inert gas in a gas containment cell, such that a second harmonic pulse is produced and generates supercontinuum terahertz radiation.

It is noted that two or all three selections can be made.

Said sample investigation system can further comprise a speckle reducer; said speckle reducer serving to reduce wild swings in intensity of electromagnetic radiation as a function of time and position in a beam, resulting from interference effects between different coherent wavelengths in said extensively broadened spectrum.

Said sample investigation system can further comprise a polarization state generator between said source of a beam of electromagnetic radiation and said stage for supporting a sample, and a polarization state analyzer between said stage for supporting a sample and said detector, and the system is an ellipsometer or polarimeter, and optionally further comprises a compensator in the polarization state generator and/or said polarization state detector.

Said sample investigation system can comprise a speckle reducer in the form of a multimode fiber.

Said sample investigation system can comprise a speckle reducer in the form of a beam diffuser.

Said sample investigation system can comprise a speckle reducer in the form of a fly's-eye beam homogenizer.

Said sample investigation system comprises a speckle reducer in the form of a rotating beam diffuser.

Said sample investigation system can comprise a speckle reducer in the form of a piezoelectric electric crystal driven beam diffuser.

Said sample investigation system can comprise a speckle reducer in the form of an electronic means to shorten temporal coherence length.

Said sample investigation system can further comprise at least one selection from the group consisting of:
- said system further comprises a Michelson interferometer and said supercontinuum laser source of electromagnetic radiation is in functional combination therewith, said source being an FTIR source;
- said system further comprises a wavelength modifier for accepting electromagnetism of relatively long (short) wavelengths, and providing output of shorter (longer) wavelengths which detector element(s) can detect;
- said detector system comprises a single element;

said detector system comprises a multiplicity of detector elements which can detect wavelengths exiting from said wavelength modifier when relatively longer (shorter) wavelengths are entered thereinto, and in which said detectable wavelengths are guided into said detector elements via at least one selection the group consisting of:
- at least one beam splitter;
- at least one combined dichroic mirror and prism; and
- at least one grating; and said system further comprises a second source that provides wavelengths within a range longer or shorter than that provided by said supercontinuum laser.

A present invention method of investigating a sample can comprise:

a) providing a sample investigation system selected from the group consisting of:
- a reflectometer;
- a spectrophotometer;
- an ellipsometer; and
- a polarimeter;

comprising:

a') a source of a beam of a spectroscopic beam of electromagnetic radiation;

b') a stage for supporting a sample; and c') a detector system for monitoring electromagnetic radiation provided from a single sample.

Said system is distinguished in that said source of a high intensity, highly directional spectroscopic beam of electromagnetic radiation is a supercontinuum laser that provides a coherent spectrum of electromagnetic radiation wavelengths within a range comprising 400 to at least 4400 nm, that results from interaction of a pulsed laser and non-linear processes to cause extensive spectral broadening, said system further comprising a second source that provides wavelengths within a range longer or shorter than that provided by said supercontinuum laser, said system being configured so that both sources provide electromagnetic radiation to substantially the same location on said sample as said supercontinuum source.

Said system further comprises a speckle diminisher in the form of a selection from the group consisting of:
- a multimode fiber;
- a beam diffuser;
- a fly's-eye beam homogenizer;
- a rotating beam diffuser;
- a piezoelectric electric crystal driven beam diffuser;
- an electronic means to shorten temporal coherence length;

said speckle reducer serving to reduce wild swings in intensity of electromagnetic radiation as a function of position in a beam resulting from interference effects between different coherent wavelengths in said extensively broadened spectrum.

Said sample investigation system is characterized by at least one selection from the group consisting of:

The Primary Selection Group

Said method continues with:

b) causing a spectroscopic beam of speckle reduced electromagnetic radiation provided by said supercontinuum laser and speckle reducer to interact with a sample on said stage, then enter said detector system and/or causing electromagnetic radiation provided by said second source interact with a sample on said stage and enter said detectore;

c) analyzing data provided by said detector to characterize said sample.

Said detector can comprise a system of at least two detectors and means for distributing a portion of said spectroscopic beam to each based on wavelength.

Another recitation of a sample investigation system selected from the group consisting of:
- a reflectometer;
- a spectrophotometer;
- an ellipsometer; and
- a polarimeter;

comprising:

a) a source of a spectroscopic beam of electromagnetic radiation;

b) a stage for supporting a sample; and c) a detector system for monitoring electromagnetic radiation.

Said system is distinguished in that:

said source of a spectroscopic beam of electromagnetic radiation is a supercontinuum laser that provides a high intensity, highly directional coherent spectrum of electromagnetic radiation wavelengths within a range comprising 400 to at least 4400 nm, that results from interaction of a pulsed lases and non-linear processes to cause extensive spectral broadening, said system further comprising a second source that provides wavelengths within a range longer or shorter than that provided by said supercontinuum laser, said system being configured so that both sources provide electromagnetic radiation to substantially the same location on said sample as said supercontinuum source;

and in that said sample investigation system is characterized by:

The Primary Selection Group

Said system further comprises a speckle reducer in the form of a selection from the group consisting of:
- a multimode fiber;
- a beam diffuser;
- a fly's-eye beam homogenizer;
- a rotating beam diffuser;
- a piezoelectric electric crystal driven beam diffuser;
- an electronic means to shorten temporal coherence length;

said speckle reducer serving to reduce wild swings in intensity of electromagnetic radiation as a function of time and position in a beam, resulting from interference effects between different coherent wavelengths in said extensively broadened spectrum.

Said system can also further comprise a polarization state generator between said source of a beam of electromagnetic radiation and said stage for supporting a sample, and a polarization state analyzer between said stage for supporting a sample and said detector, and the system is an ellipsometer or polarimeter, said system optionally further comprising a compensator in the polarization state generator and/or said polarization store detector.

Said sample investigation system can comprise a speckle reducer in the form of a multimode fiber, a beam diffuser, a fly's-eye beam homogenizer, a rotating beam diffuser, a piezoelectric electric crystal driven beam diffuser or an electronic means to shorten temporal coherence length.

Where applicable, the detector system in any embodiment can be comprised of a selection from the group consisting of:
- a Golay cell;
- a Bolometer;
- a thermocouple;
- is comprised of photoconductive material;
- is comprised of photovoltaic material;
- is comprises of Deuterated Triglycine Sulfate (DTGS);
- is comprised of HgCdTe (MCT);
- is comprised of LiTaO3;
- is comprised of PbSe;
- is comprised of PbS; and
- is comprised of InSb;

said group further comprising:
- said detector system comprises a multiplicity of detector elements which can detect wavelengths guided thereinto into via at least one selection the group consisting of:
  - at least one beam splitter;
  - at least one combined dichroic mirror and prism; and
  - at least one grating.

Another recitation of a sample investigation system for use in investigating samples over a wavelength range comprising between 400 nm up to at least 50000 nm, said sample investigation system being selected from the group consisting of:
- a reflectometer;
- a spectrophotometer;
- an ellipsometer; and
- a polarimeter;

and comprising:
- a) a source of a spectroscopic beam of electromagnetic radiation;
- b) a stage for supporting a sample; and
- c) at least one detector system for monitoring electromagnetic radiation.

Said source of a spectroscopic beam of electromagnetic radiation being selected from the group consisting of:
- a supercontinuum laser;
- a Nernst Glower;
- a Globar;
- a laser stabilized arc lamp;
- a HG arc lamp; and
- a fixed or tunable quantum cascade laser; and which provide wavelengths in the infrared and/or terahertz ranges.

Said at least one detector system can comprise detector element(s) which are incapable of detecting long electromagnetic radiation wavelengths over at least part of the infrared and terahertz ranges. In this case said sample investigation system further comprises at least one wavelength modifier which, in use, accepts relatively long (short) wavelength electromagnetic radiation which the element(s) in said at least one detector system are incapable of detecting, and providing as output shorter (longer) wavelengths which said detector element(s) are capable of detecting, and entering said detectable wavelengths into said at least one detector system comprised of element(s) which can detect said shorter (longer) wavelength electromagnetic radiation.

Another recitation of a method of investigating a sample comprising the steps of:
- a) providing a sample investigation system for use in investigating samples over a wavelength range comprising between 400 nm to at least 50000 nm, said sample investigation system being selected from the group consisting of:
  - a reflectometer;
  - a spectrophotometer;
  - an ellipsometer; and
  - a polarimeter;

and comprising:
- a') a source of a spectroscopic beam of electromagnetic radiation;
- b') a stage for supporting a sample; and
- c') at least one detector system for monitoring electromagnetic radiation;

wherein said source of a spectroscopic beam of electromagnetic radiation is selected from the group consisting of:
- a supercontinuum laser;
- a Nernst Glower;
- a Globar;
- a laser stabilized arc lamp;
- a HG arc lamp; and
- a fixed or tunable quantum cascade laser;

which provide wavelengths in the infrared and/or terahertz ranges.

Said at least one detector system can comprising detector element(s) which are incapable of detecting long electromagnetic radiation wavelengths over at least part of the infrared and terahertz ranges, and said sample investigation system further comprise at least one wavelength modifier which, in use, accepts relatively long (short) wavelength electromagnetic radiation which the element(s) in said at least one detector system element(s) are incapable of detecting, and providing as output shorter (longer) wavelengths which said detector element(s) are capable of detecting, and entering said detectable wavelengths into said at least one detector system comprised of detector element(s) which can detect said shorter (longer) wavelength electromagnetic radiation.

Said method continues with:
- b) selecting the supercontinuum laser source and further providing a speckle reducing system selected from the group consisting of:
  - a multimode fiber;
  - a beam diffuser;
  - a fly's-eye beam homogenizer;
  - a rotating beam diffuser;
  - a piezoelectric electric crystal driven beam diffuser; and
  - an electronic means to shorten temporal coherence length;
- c) placing a sample to be investigated onto said stage for supporting a sample;
- d) causing a beam of electromagnetic radiation to be produced by said supercontinuum laser source and interact with said sample, then enter said at least one detector system for monitoring electromagnetic radiation;

causing said beam of electromagnetic radiation to also interact with said speckle reducing system and said wavelength modifier between said supercontinuum laser source and said at least one detector system comprising element(s) which are incapable of detecting long (short) electromagnetic radiation wavelengths over at least part of the infrared and terahertz ranges;

such that electromagnetic radiation of wavelength(s) which the element(s) in said at least one detector can detect are entered into said at least one detector system; and e) analyzing output from said at least one detector to provide insight to characteristics of said sample.

Another method of investigating a sample comprises the steps of:
    a) providing a sample investigation system for use in investigating samples over a wavelength range comprising between 400 nm up to at least 50000 nm, said sample investigation system being selected from the group consisting of:
    a reflectometer;
    a spectrophotometer;
    an ellipsometer; and
    a polarimeter;

and comprising:
    a') a source of a spectroscopic beam of electromagnetic radiation;
    b') a stage for supporting a sample; and
    c') at least one detector system for monitoring electromagnetic radiation.

Said source of a spectroscopic beam of electromagnetic radiation can be selected from the group consisting of:
    a supercontinuum laser;
    a Nernst Glower;
    a Globar;
    a laser stabilized arc lamp;
    a HG arc lamp; and
    a fixed or tunable quantum cascade laser;
which provide wavelengths in the infrared and/or terahertz ranges.

Said at least one detector system can comprise detector element(s) which are incapable of detecting electromagnetic radiation wavelengths over at least part of the infrared and terahertz ranges;

Said sample investigation system can further comprise at least one wavelength modifier which, in use, accepts relatively long (short) wavelength electromagnetic radiation which the detector element(s) in said at least one detector system are incapable of detecting, and providing as output shorter (longer) wavelengths which said detector element(s) are capable of detecting, and entering said detectable wavelengths into said at least one detector system comprised of elements) which can detect said shorter wavelength electromagnetic radiation.

Said method continues with:
    b) selecting other than the supercontinuum laser source of electromagnetic radiation;
    c) placing a sample to be investigated onto said stage for supporting a sample;
    d) causing a beam of electromagnetic radiation to be produced by said source and interact with said sample, then enter said at least one detector system for monitoring electromagnetic radiation;

causing said beam of electromagnetic radiation to also interact with said wavelength modifier between said source and said at least one detector system comprising detector element(s) which are incapable of detecting long (short) electromagnetic radiation wavelengths over at least part of the infrared and terahertz ranges;

such that electromagnetic radiation of wavelength(s) which the detector element(s) in said at least one detector can detect are entered into said at least one detector system; and
    e) analyzing output from said at least one detector to provide insight to characteristics of said sample.

In any of the foregoing examples, where appropriate, the sample investigation system can provide that the supercontinuum laser source of electromagnetic radiation is in functional combination with a Michelson interferometer; and said detector is selected from the group consisting of:
    a Golay cell;
    a Bolometer;
    a thermocouple;
    a detector characterized by comprising a material selected from the group consisting of:
    Deuterated Triglycine Sulfate (DTGS);
    HgCdTe (MCT);
    LiTaO3;
    PbSe;
    PbS;
    InSb; and
    InSb.

Another present invention sample investigation system for use in investigating samples over a wavelength range, provides that said sample investigation system being selected from the group consisting of:
    a reflectometer;
    a spectrophotometer;
    an ellipsometer; and
    a polarimeter;
comprising:
    a) a source of a beam of a spectroscopic beam of electromagnetic radiation selected from the group consisting of:
    a supercontinuum laser; and
    a source for providing wavelengths longer or shorter than provided by said supercontinuum laser;
    b) a stage for supporting a sample; and
    c) a detector system for monitoring electromagnetic radiation provided from a single sample.

Said at least one detector system can comprise detector element(s) which are incapable of detecting long (short) electromagnetic radiation wavelengths over at least part of the source provided range of wavelengths.

Said system can further require that at least one selection from the group consisting of:
    at least one wavelength modifier which, in use, accepts relatively long (short) wavelength electromagnetic radiation which the element(s) in said at least one detector system are incapable of detecting and providing as output shorter (longer) wavelengths which said detector element(s) can detect, the output of which wavelength modifier is entered as detectable wavelengths into said detector system detector element(s); and
    a speckle reducer, said speckle reducer serving to reduce wild swings in intensity of electromagnetic radiation as a function of time and position in a beam, resulting from interference effects between different coherent wavelengths in said extensively broadened spectrum;
be present.

The present invention is then found in use of combinations of:

the application of systems of detectors;
the use of a supercontinuum lasers;
the application of a speckle reducers;
the application of additional sources of electromagnetic radiation;
the application of a supercontinuum lasers in Fourier transform infrared sources;
the application of Wavelength Modifiers.

Detector Systems

The present invention comprises use of both single element and multielement Detectors. When a beam, be it monochromatic or spectroscopic is to be analyzed as a whole, a single element detector such as:
 a Golay cell;
 a Bolometer;
 a thermocouple;
or a detector which is:
 a photoconductive material;
 a photovoltaic material;
 comprises Deuterated Triglycine Sulfate (DTGS);
 comprises HgCdTe (MCT);
 comprises LiTaO3;
 comprises PbSe;
 comprises PbS; or
 comprises InSb;
can be utilized. When a Source of electromagnetic radiation is functionally combined with a Michelson Interferometer, for instance, this often the case.

A present invention detector system can alternatively comprise means for producing a plurality of separate wavelength ranges from a spectroscopic beam incident thereupon, said system comprising a sequence of at least two elements, each thereof being selected from the group consisting of:
 a grating which when presented with an incident spectroscopic beam of electromagnetic radiation produces a spectrum of diffracted dispersed wavelengths and simultaneous therewith an altered spectral content reflected beam of electromagnetic radiation;
 a combination dichroic beam splitter-prism which when presented with a spectroscopic beam of electromagnetic radiation produces a spectrum of dispersed wavelengths that transmit through and exit from said prism, and simultaneous therewith an altered spectral content reflected beam of electromagnetic radiation.

In use a spectroscopic beam of electromagnetic radiation from said source thereof is caused to interact with a sample placed on said stage, and then impinge onto a first selected element such that a spectrum of dispersed wavelengths is produced and directed toward a first detector, simultaneous with production of a reflected altered spectral content reflected beam of electromagnetic radiation which is directed to impinge on a second selected element which likewise produces a spectrum of dispersed wavelengths which are directed toward a second detector.

The reflected altered spectral content reflected beam of electromagnetic radiation can be directed to impinge on a beam splitter that directs at least some of said beam onto a third selected element which produces a spectrum of dispersed wavelengths that are directed into a third detector, while continuing to direct at least some of said altered spectral content beam toward said second selected element which continues to direct the limited range spectrum of dispersed wavelengths produced thereby toward said second detector.

Said detector system can comprise at least one selection from the group consisting of:
 at least one of said first and second selected elements is/are designed to optimally structure the range of wavelengths exiting therefrom;
 at least one of said first and second detectors is/are designed to optimally detect the range of wavelengths input thereinto by said first and second selected elements respectively;
is functionally enabled.

Said detector system can further comprise more than two selected elements, and in which the reflected electromagnetic beam produced by the second selected element is directed toward at least one selection from the group consisting of:
 a dichroic beam splitter and then therefrom impinge onto a third selected element;
 directly impinge onto a third selected element;
 at least one reflector and then a dichroic beam splitter and then therefrom impinge onto a third selected element; and
 at least one reflector and then impinge onto a third selected element.

Said detector system can provide that the third selected element, upon receiving said reflected beam of electromagnetic radiation produces a spectrum of dispersed wavelengths which are directed toward a third detector.

Said detector system can provide that at least one selection from the group consisting of:
 said third selected element is designed to optimally structure the range of wavelengths exiting therefrom;
 said third detector is designed to optimally detect the range of wavelengths input thereinto by said first and second selected elements respectively;
is enabled.

Said detector system can provide that a forth element is selected and in which the reflected electromagnetic beam produced by the third selected element or which exits a present dichroic beam splitter associated with said second selected element, is directed toward at least one selection from the group consisting of:
 a dichroic beam splitter and then therefrom impinge onto a forth selected element;
 directly impinge onto a forth selected element;
 at least one reflector and then a dichroic beam splitter and then therefrom impinge onto a forth selected element; and
 at least one reflector and then impinge onto a forth selected element.

Said detector system can provide that the forth selected element, upon receiving said reflected beam of electromagnetic radiation produces a spectrum of dispersed wavelengths which are directed toward a forth detector.

Said detector, system can provide that at least one selection from the group consisting of:
 said forth selected element is designed to optimally structure the range of wavelengths exiting therefrom;
 said forth detector is designed to optimally detect the range of wavelengths input thereinto by said first and second selected elements respectively;
is enabled.

Said detector system can specifically involve a beam of spectroscopic electromagnetic radiation from said sample that is caused to imping onto a grating or a combination dichroic beam splitter-prism which produces said spectrum of diffracted dispersed wavelengths, which spectrum is directed to enter a detector; and simultaneously produces said altered spectral content reflected beam of electromagnetic radiation which is directed to interact with a dichroic beam splitter that causes said altered spectral content reflected beam of electromagnetic radiation to split into two beams, both of which are directed to separate selections from the group consisting of:
    a grating which when presented with an incident spectroscopic beam of electromagnetic radiation produces a spectrum of diffracted dispersed wavelengths and simultaneous therewith an altered spectral content reflected beam of electromagnetic radiation;
    a combination dichroic beam splitter-prism which when presented with a spectroscopic beam of electromagnetic radiation produces a spectrum of wavelengths that transmit through and exit from said prism, and simultaneous therewith an altered spectral content reflected beam of electromagnetic radiation;
such that the spectrum of dispersed wavelengths that exit from a present grating or combination dichroic beam splitter-prism are each caused to enter separate detectors.

Said detector system can provide that the spectroscopic beam of electromagnetic radiation from said sample which is caused to impinge onto a first selected element such that a spectrum of dispersed wavelengths is produced and directed toward a first detector, simultaneous with production of an altered spectral content reflected beam of electromagnetic radiation which is directed to impinge on a second selected element which likewise produces a spectrum of dispersed wavelengths which are directed toward a second detector, is the output beam of an ellipsometer or polarimeter which exits the analyzer thereof.

Said detector system can specifically involve a beam of spectroscopic electromagnetic radiation from said sample that is caused to interact with a sequence of elements comprising:
    a first grating and first and first detector, wherein the reflected beam exiting said first grating is a zero order beam and is directed to a second grating and second detector.

Said detector system can specifically involve a beam of spectroscopic electromagnetic radiation from said sample that is caused to interact with a sequence of elements comprising:
    a first grating and first detector, wherein the reflected beam exiting said first grating is a zero order beam and is directed to a first combination dichroic beam splitter-prism and second detector.

Said detector system can specifically involve a beam of spectroscopic electromagnetic radiation from said sample that is caused to interact with a sequence of elements comprising:
    a dichroic beam splitter which sends first and second ranges of dispersed wavelengths, which are substantially above and below a certain wavelength, respectively, each to a selection from the group consisting of:
        a first grating and first detector, wherein the reflected beam exiting said first grating is a zero order beam and is directed to a second grating and second detector; and
        a first grating and first detector, wherein the reflected beam exiting said first grating is a zero order beam and is directed to a first dichroic beam splitter-prism combination and second detector.

Said detector system can specifically involve a beam of spectroscopic electromagnetic radiation from said sample that is caused to interact with a sequence of elements comprising:
    a first combination dichroic beam splitter-prism and first detector, and wherein the reflected beam reflecting from said first combination dichroic beam splitter-prism is directed to a first grating and second detector.

Said detector system can specifically involve a beam of spectroscopic electromagnetic radiation from said sample that is caused to interact with a sequence of elements comprising:
    a first grating and first detector, wherein the reflected beam produced by said first grating is a zero order beam and is directed to a second grating and second detector, and in which the reflected beam produced by said second grating is a zero order beam directed to a third grating and third detector.

Said detector system can specifically involve a beam of spectroscopic electromagnetic radiation from said sample that is caused to interact with a sequence of elements comprising:
    a first grating and first detector, wherein the reflected beam produced by said first grating is a zero order beam and is directed to a first combination dichroic beam splitter-prism and second detector, and in which the reflected beam reflected from said first combination dichroic beam splitter-prism is directed to a third grating and third detector via a dichroic beam splitter.

Said detector system can specifically involve a beam of spectroscopic electromagnetic radiation from said sample that is caused to interact with a sequence of elements comprising:
    a first grating and first detector, wherein the reflected beam produced by said first grating is a zero order beam and is directed to a second grating and second detector, and in which the reflected beam produced by said second grating is a zero order beam and is directed to a first dichroic beam splitter-prism combination and third detector.

Said detector system can specifically involve a beam of spectroscopic electromagnetic radiation from said sample that is caused to interact with a sequence of elements comprising:
    a first grating and first detector, wherein the reflected beam produced by said first grating is a zero order beam and is directed to a first combination dichroic beam splitter-prism and second detector, and in which the reflected beam reflected from said first combination dichroic beam splitter-prism is directed to a second dichroic beam splitter-prism combination and third detector via a beam splitter.

Said detector system can specifically involve a beam of spectroscopic electromagnetic radiation from said sample that is caused to interact with a sequence of elements comprising:
    a first combination dichroic beam splitter-prism and first detector, wherein the reflected beam reflected by said first combination dichroic beam splitter-prism is directed to a second grating and second detector, and in which the reflected beam produced by said second grating is a zero order beam and is directed to a third grating and third detector.

Said detector system can specifically involve a beam of spectroscopic electromagnetic radiation from said sample that is caused to interact with a sequence of elements comprising:
    a first combination dichroic beam splitter-prism and first detector, wherein the reflected beam reflected from said first combination dichroic beam splitter-prism is directed to a second dichroic beam splitter-prism combination and second detector, and in which the reflected beam reflected from said second combination dichroic beam splitter-prism is directed to a third grating and third detector via a dichroic beam splitter.

Said detector system can specifically involve a beam of spectroscopic electromagnetic radiation from said sample that is caused to interact with a sequence of elements comprising:

a first combination dichroic beam splitter-prism and first detector, wherein the reflected beam reflected from said first combination dichroic beam splitter-prism is directed to a first grating and second detector, and in which the reflected beam produced by said-second grating is a zero order beam and is directed to a second combination dichroic beam splitter-prism and third detector.

Said detector system can specifically involve a beam of spectroscopic electromagnetic radiation from said sample that is caused to interact with a sequence of elements comprising:

a first combination dichroic beam splitter-prism and first detector, wherein the reflected beam reflected from said first combination dichroic beam splitter-prism is directed to a second combination dichroic beam splitter-prism and second detector, and in which the reflected beam reflected from said combination second dichroic beam splitter-prism is directed to a third combination dichroic beam splitter-prism and third detector via a beam splitter.

Said detector system can involve a spectrum of dispersed diffracted wavelengths are produced by a grating is a + or − order spectrum.

It is also to be understood that where relatively shorter wavelengths can be modified to longer wavelengths, which longer wavelengths are to be monitored by, for instance, a Golay Cell, a Bolometer or a Micro-Bolometer etc.) As relatively long wavelengths are provided by the Sources in the present invention, however, the present invention more likely comprises a wavelength modifier for changing relatively longer wavelength electromagnetic radiation to shorter wavelength electromagnetic radiation, in functional combination with, for instance, solid state detector elements which cannot monitor the longer wavelengths, but can monitor the shorter wavelength, higher energy wavelengths. The typical configuration in the context of the present invention is that the source provides wavelengths in the infrared and/or terahertz ranges, and the detector elements are solid state which can only detect higher energy, shorter wavelengths. However, this does not exclude the situation wherein the wavelength modifier inputs relatively shorter wavelengths and outputs longer wavelengths and the detector elements are Golay Cells, Bolometers, Micro-Bolometers etc. Where solid state detector elements are used, the present invention provides Utility in the form of reduced initial and operational costs, (eg. cooling when longer wavelengths are detected).

In the Claims, where element(s) is recited, the distinction between Detector type is indicated. That is, the Claim should be interpreted to apply to the case where a Detector comprises a single element and monitors monochromatic or all wavelengths of a Spectroscopic beam together, or to the case where wavelengths are separated and monitored individually.

The present invention will be better understood by reference to the Detailed Description of this Specification in conjunction with the Drawings.

BRIEF DESCRIPTION OF THE DRAWINGS

FIG. 3a' shows the situation wherein a Reflected (RB) beam is reflected from dichroic beam splitter-prism (DBS-PR) combination at a surface thereof on which is present a Coating, to give it the Dichroic property. Note that a spectrum of at least a + or − order spectrum exits the Prism (P).

FIGS. 7a and 7b show, respectively, typical Intensity vs. position in a beam for a beam of electromagnetic radiation provided by a supercontinuum laser source over a range of about 400-2500 nm, and the same results when a Speckle Reducer is applied to the plot of FIG. 7a.

DETAILED DESCRIPTION

Figure 1:
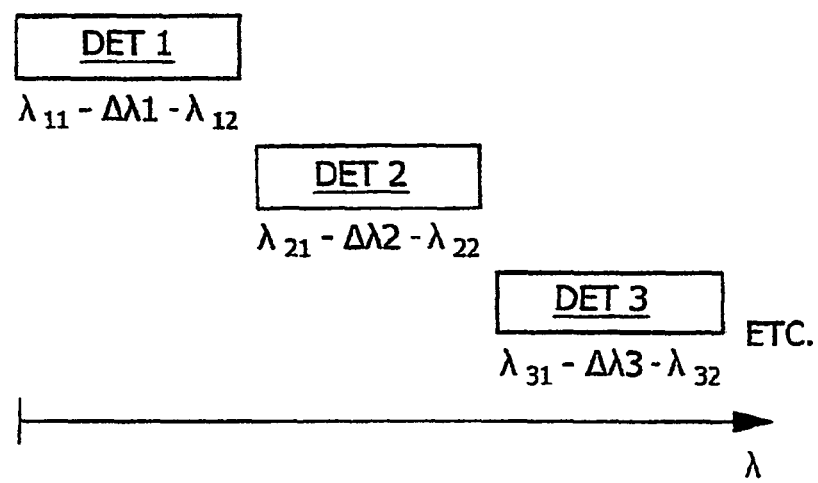
FIG. 1 demonstrates a number of wavelength ranges in which various multi-channel detectors (DET1) (DET2) (DET3) are designed to handle optimally.

Turning now to FIG. 1, there are demonstrated a number of wavelength ranges in which various multi-channel detectors (DET1) (DET2) (DET3) are designed to handle optimally. Many additional wavelength ranges could be shown similarly as well, such as a (4) as shown in FIG. 2.

Figure 2:
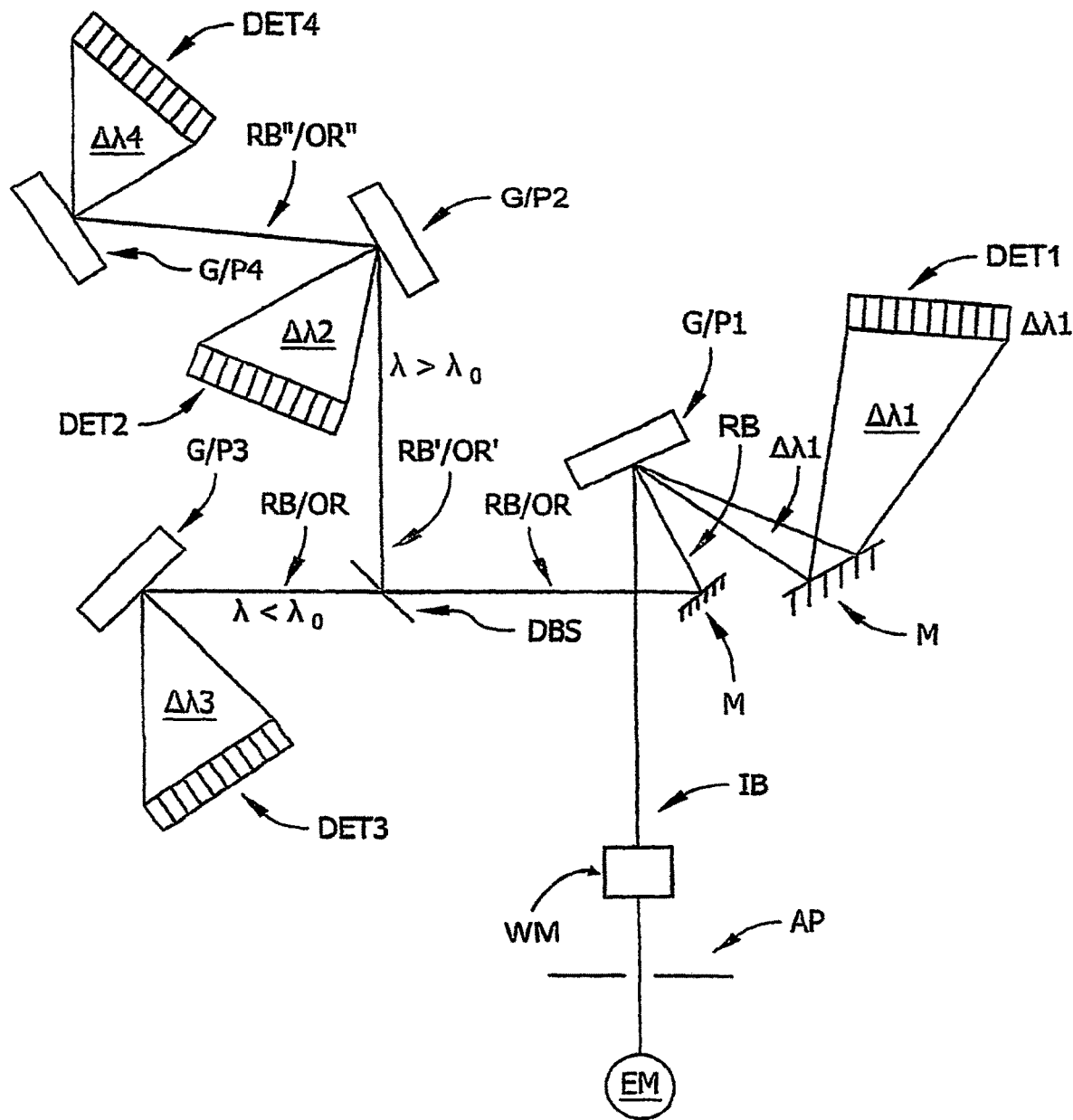
FIG. 2 shows some present invention combinations of multiple Gratings (G) and/or Dichroic Beam Splitter-Prism Combinations (DBSP), (generically represented as (G/P)), as examples that each produce at least one + or − order spectrum of wavelengths as well as a relatively more energetic Reflected Beam, (eg. Zero Order (ZO) in the case of a Grating), beam of electromagnetic radiation, which is directed to a follow-on Grating (G).

FIG. 2 shows Source (EM) of electromagnetic wavelengths in the Infrared or Terahertz ranges, a typically present Aperture and a Wavelength Modifier (WM) for accepting said Infrared or Terahertz wavelengths and typically providing output wavelengths in a range of wavelengths Solid State Detector (DET) Elements (DE's) (see FIG. 4) can detect. FIG. 2 also shows combinations of multiple Gratings (G) (see FIG. 3a) and/or Dichroic Beam Splitter-Prism Combinations (DBS-RP) (see FIG. 3a') in FIG. 2), that each produce at least one + or − order spectrum (Δλ) of wavelengths, as well as an altered spectral content Reflected (RB/OR) beam of electromagnetic radiation, (eg. a Zero Order (OR) beam as in the case of a Grating (G) or a functionally similar Reflected Beam (RB) in the case of a Dichroic Beam Splitter-Prism Combinations (DBS-PR) (both possibilities indicated as G/P- in FIG. 2). See Reflected Beam (RB) in FIG. 3a' as regards a combination dichroic beam splitter-prism (DBS-PR) and Zero Order (OR) Beam in FIG. 3a. (Note, the terminology Zero Order (ZO) is not correct in a critical sense where a Dichroic Beam Splitter-Prism Combinations (DBSP), rather than a Crating (C) is applied, even though the results provided are functionally similar). FIG. 2 is a relevant example of a Present Invention System Detector System wherein a Source (EM) of a Beam of electromagnetic radiation (IB) is shown to provide electromagnetic radiation through an Aperture (AP), and impinge on (G/P1). Exiting (G/P1) is a First Range of a + or −, typically first Order spectrum of wavelengths (i) which proceed, via reflection from a Mirror (M) as shown to Detector (DET1). Also shown is Reflected beam (RB) which reflects from another Mirror (M) and encounters a Dichroic Beam Splitter (DBS), which (DBS) directs a first amount of the entering beam to (G/P3) which disperses it into a range of wavelengths (λ) which are directed into Detector (DET3). A second amount of the Beam entering the (DBS) exits toward (G/P2) which provides a dispersed range of wavelengths (λ) that are directed into Detector (DET2), and also directs a Reflected Beam (RB"/OR" to (G/P4) which provides a dispersed range of wavelengths (λ) to Detector (DET4). It is to be understood that FIG. 2 is included to show that the Present Invention can comprise a plurality of Detectors (DET's) each of which comprise a plurality of Solid State Detector Elements (DE's) (see FIG. 4) which can detect wavelengths exiting from said Wavelength Modifier (WM) when relatively longer wavelengths (eg. in the IR or THZ ranges) are entered thereinto, and in which said wavelengths detectable by Solid State Detector Elements (DE's) from said Wavelength Modifier (WM) are guided into said Solid State Detector Elements (DE's) via Beam Splitters (DBS) and/or Prism/Dichroic Beam Splitter Combinations (DBS-PR) (see FIG. 3a') and/or Gratings (G) (see FIG. 3a).

Figure 3A:
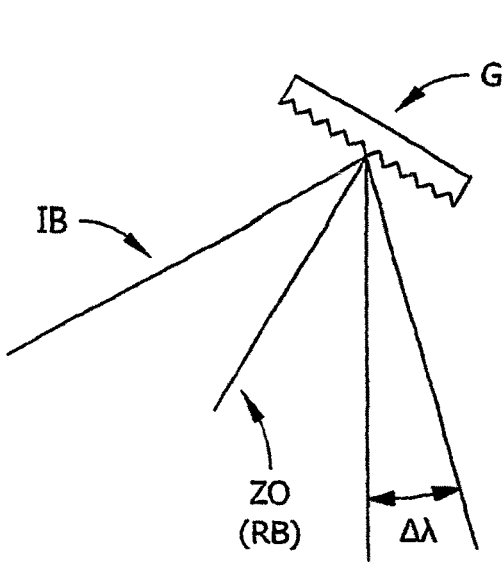
FIG. 3a shows a grating (G) that reflects an incoming beam (IB) of electromagnetism, and provides a spectrum of wavelengths (λ) in an order thereof, (eg. the first + Order), along with a Zero Order (ZO).
Figure 3A:
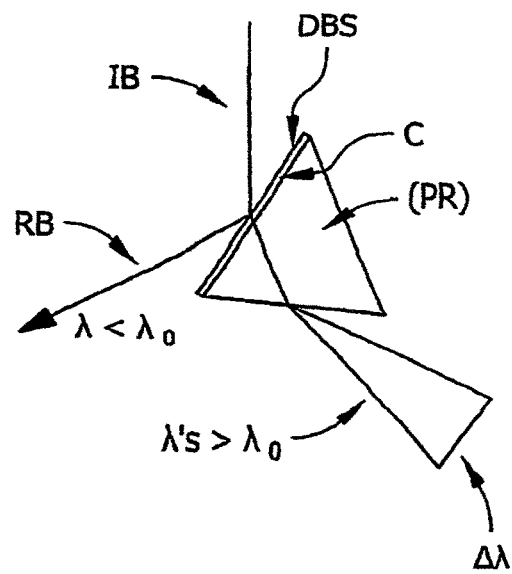

FIG. 3a demonstrates a Grating (G) wherein an Input Beam (IB) of electromagnetic radiation is impinged thereonto, with the result that at least one +/− Order Spectrum of wavelengths is produced along with a Zero Order (ZO) beam.

FIG. 3a' shows the situation wherein a Reflected (RB) beam is reflected from Dichroic Beam Splitter-Prism (DBS-PR) combination at a surface thereof on which is present a Coating, to give it the Dichroic property. Note that a spectrum of at least a + or − order spectrum exits the Prism (P). A coating (C) is indicated as present on the surface onto which the Input Beam impinges, and serves to form the Dichroic Beam Splitter (DBS). For insight, Dichroic refers to different properties, eg. reflection/transmission of electromagnetic radiation, based on wavelength.

It is to be understood that the designations of (G/P_) in FIG. 2 is to be interpreted as possibly being either of the systems in FIGS. 3a and 3a'.

Figure 4:
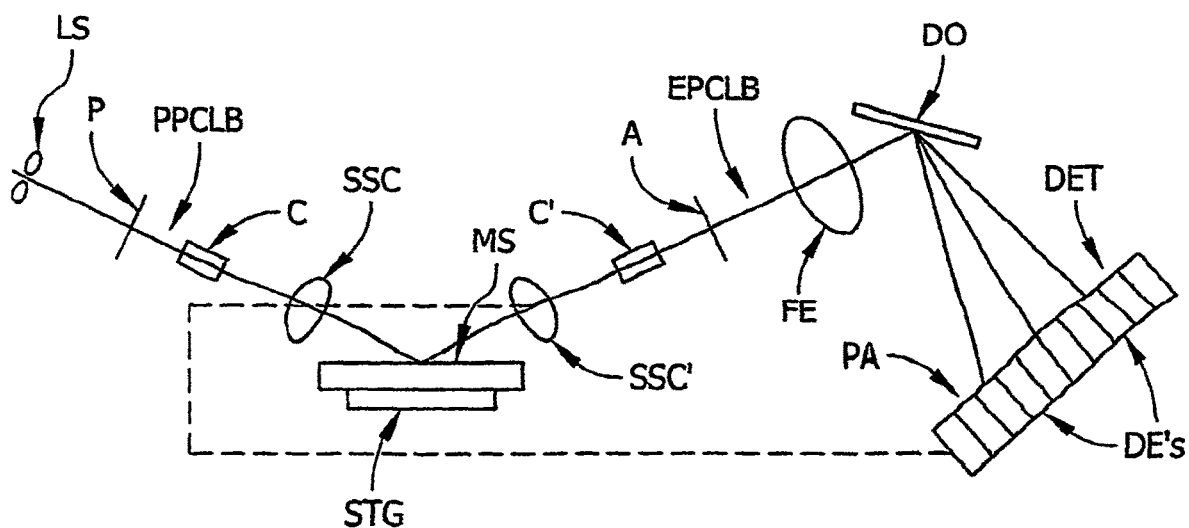
FIG. 4 demonstrates an ellipsometer system, in which the present invention finds very relevant application.

FIG. 4, (which is FIG. 2 taken from U.S. Pat. No. 7,345,762 to Liphardt et al.), is included to demonstrate an ellipsometer system, in which ellipsometer and polarimeter and the like systems the present invention finds very relevant application. When so applied the beam exiting the ellipsometer polarization state analyzer, (ie. (EPCLB) in said FIG. 4), is beneficially considered as being the beam (IB) shown in accompanying FIG. 2. Roughly, Grating (G1) in FIG. 2 corresponds to Dispersive Element (ie. Grating), (DO) in said FIG. 4. Note that FIG. 4 shows an ellipsometer Source (LS) which provides an ellipsometer beam (PPCLB) which has been polarized by interaction with the shown Polarizer (P). Said beam (PPCLB) is then caused to interact with a shown Sample (MS), which is indicated can be a focused beam at that point. A beam reflected from said Sample (MS) can be re-collimated, and then pass through an Analyzer (A) and emerge as beam (EPCLB), before being focused by (FE) onto a Dispersive Element, (eg. a Grating) (DO), which (DO) serves to disperse wavelengths into a Multi-element Detector (PA). One or two Compensators (C) can also be present as shown in the Polarization State Generator or Analyzer or the system associated with the Polarizer and Analyzer respectively. Again, for correspondence, Dispersive Element (DO) is roughly equivalent to Grating (G1) in FIG. 2. Also shown is indication that the Focusing (SSC) and Recollimating (SSC') lenses can be controlled as to position to optimize intended effects.

Figure 5:
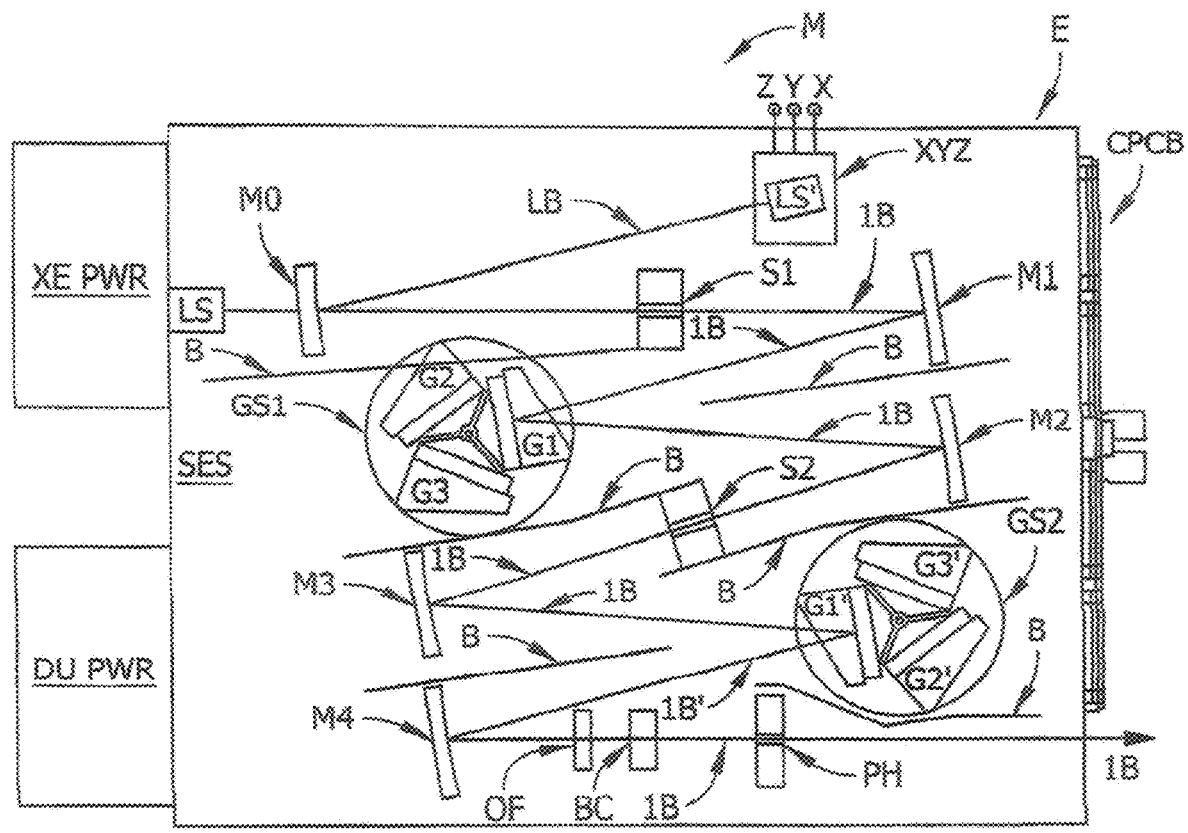
FIG. 5 shows the use of sequential follow-on Gratings which electromagnetic radiation sequentially caused to encounter.

FIG. 5, (from FIG. 9 in U.S. Pat. No. 7,345,762), is included to show the use of sequential follow-on Gratings (eg. G1 and G1') to arrive at a desired wavelength in a spectrometer system.

Figure 6:
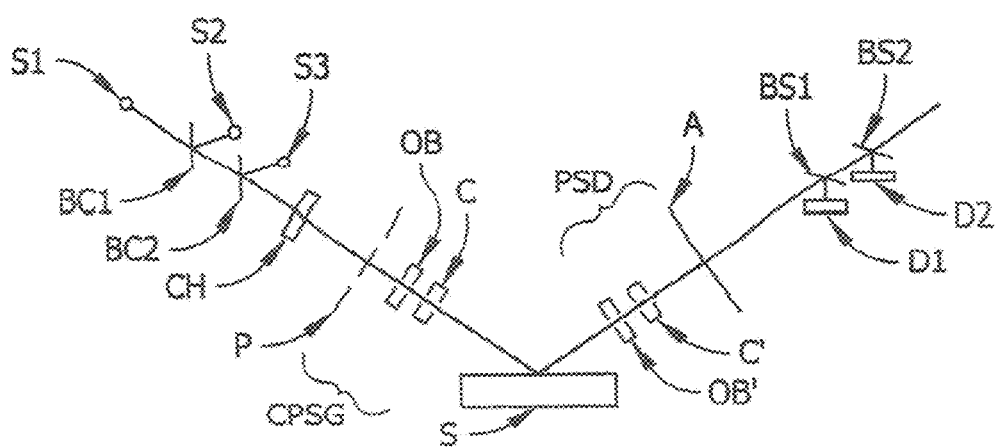
FIG. 6 shows the use of beam splitters to direct portions of beams into different detectors which can be optimized to respond to different wavelength ranges.

FIG. 6, (taken from FIG. 1a in U.S. Pat. No. 8,169,611), is included to show the use of beam splitters (B1, and B2) to direct portions of beams into different detectors (D1 and D2) which can be optimized to respond to different wavelength ranges. See U.S. Pat. Nos. 7,345,762 and 8,169,611 for more clarification. Said Patents however, do not suggest the present invention directing a Reflected altered spectral content Beam to follow-on beam dispersing elements. FIG. 6 also shows the use of beam splitters to direct portions of beams into different detectors which can be optimized to respond to different wavelength ranges.

The +/− orders shown in the Drawings can be described generally as being wavelength ranges that are produced when a grating is presented with an incident spectroscopic beam of electromagnetic radiation and in response produces a spectrum of diffracted dispersed wavelengths, and simultaneous with an altered spectral content reflected beam of electromagnetic radiation, typically a Zero-Order beam.

Figure 7A:
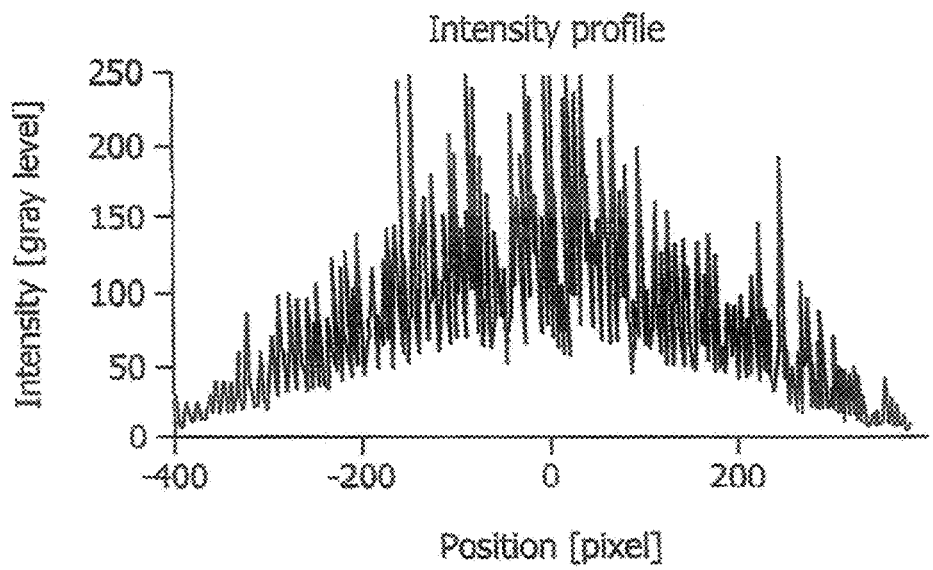

Continuing, FIG. 7a shows a typical Intensity vs. Position within a Beam Cross-section for a beam of electromagnetic radiation provided by a supercontinuum laser source over a range of about 400 to at least 4400 nm. Note in particular that effects of interactions between coherent components thereof leads to a very inconsistent Intensity plot. It is noted that Speckle can lead to Wavelength instability.

Figure 7B:
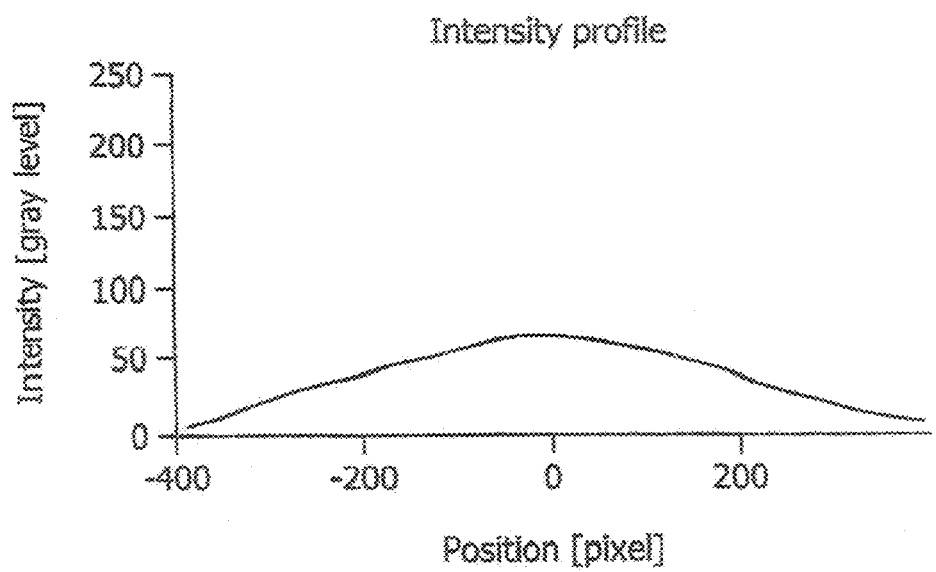

FIG. 7b shows that application of a "Speckle Reducer" to the beam Intensity profile in FIG. 6 allows a much more stable beam intensity vs. position in a beam profile to be achieved. This much more stable intensity profile is well suited to application in metrology systems such as ellipsometers, polarimeters, reflectometers and reflectometers. It is believed that use of a Supercontinuum Laser Source and Speckle Reducer as described in this Specification is new and novel, particularly in combination with the also described system of Detectors. As mentioned earlier in this Specification, a coherent source leads to interference effects, the present system comprises a speckle diminisher in the form of a selection from the group consisting of:

a multimode fiber;

a beam diffuser;
a fly's-eye beam homogenizer;
a rotating beam diffuser;
a piezoelectric electric crystal driven beam diffuser;
an electronic means to shorten temporal coherence length;
to effectively remove wide changes in intensity very small wavelength ranges, (ie. speckle).

Figure 8A:
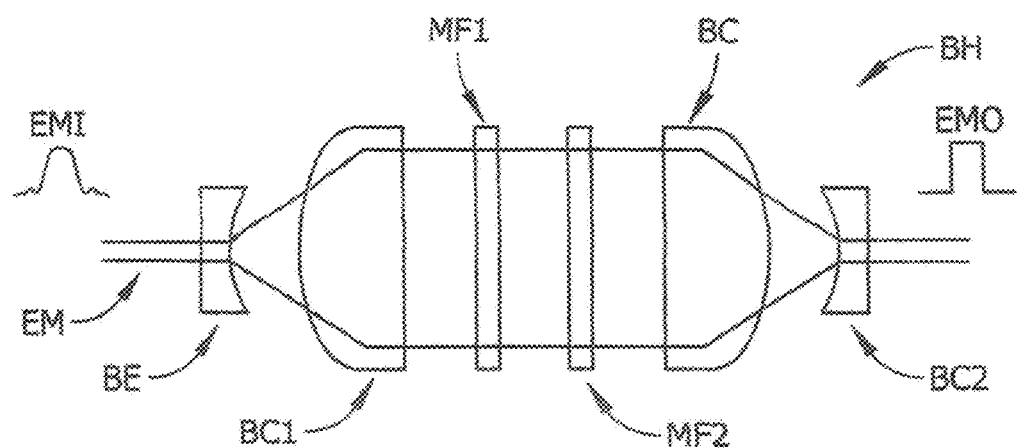
FIGS. 8a-8a''' show a Fly's Eye approach to reducing Speckle.
Figure 8A:
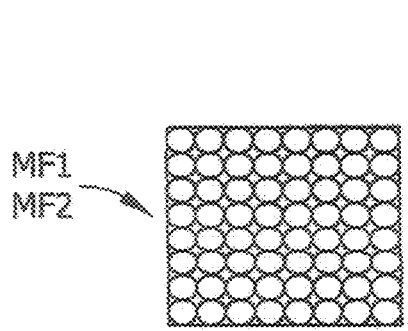
Figure 8A:
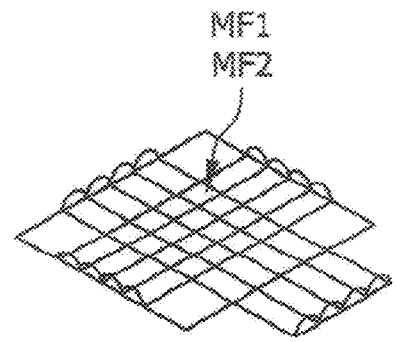
Figure 8A:
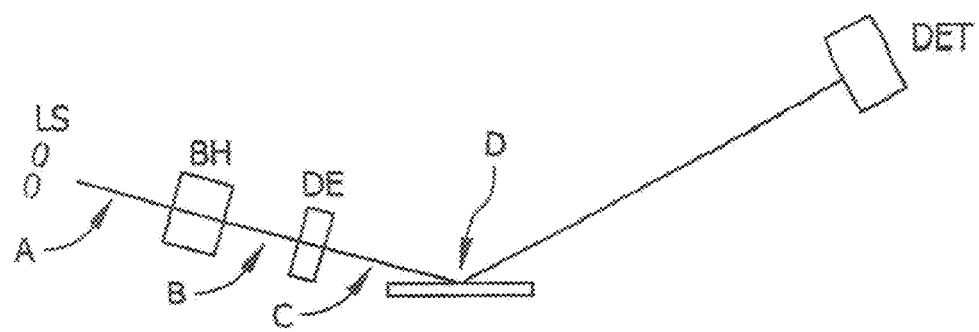

FIGS. 8a-8a''' show a Beam Homogenzing approach to reducing Speckle. Note that in FIG. 8a shows that input electromagnetic radiation shown as (EMI), which is of a very uneven intensity but can be transformed into output electromagnetic radiation shown as (EMO), which is of a very even intensity. The system consists of a Beam Expander (BE), a Beam Collimator (BC1), two Fly's Eye lenses (MF1) (MF2), a second Beam Collimator (BC2) applied to focus the Collimated beam exiting (MF2), and a Second Beam Collimator (BC2) which re-collimates the beam presented to it. The energy content of (EM1) has been distributed uniformly by the actions of the Fly's Eye lenses (MF1) and (MF2) as indicated by (EMO). FIGS. 8a' and 8a'' show typical Fly's Eye lens construction. FIG. 8a''' is included to indicate how the system of FIG. 8a (BH) can be applied in an Ellipsometer system. At "A" the entering beam from Source (LS) is as shown as (EMI), and "B" the beam energy is distributed as is shown by (EMO), and a Polarization Element (DE) can be applied prior to said beam interacting with Sample (and location (D), with a Detector positioned to monitor a reflected beam from said Sample at location (D) thereon.

Figure 8B:
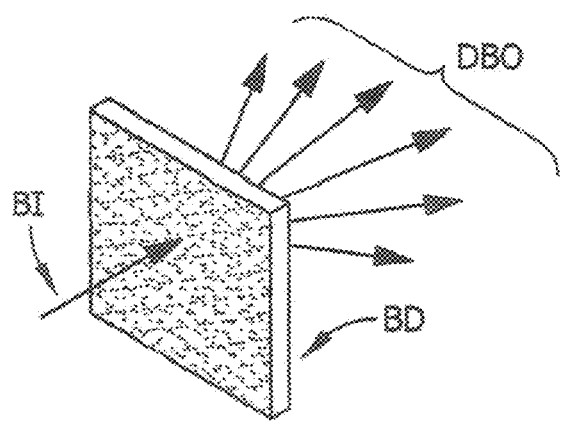
FIGS. 8b-8f show various Speckle Reducers.
Figure 8C:
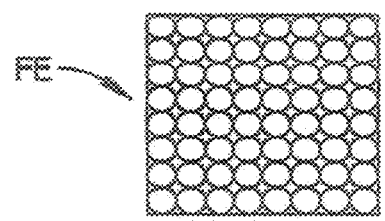
Figure 8F:
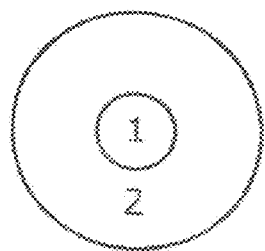
Figure 8D:
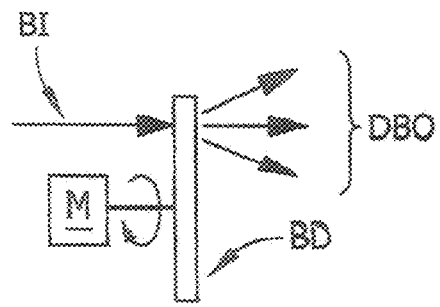
Figure 8E:
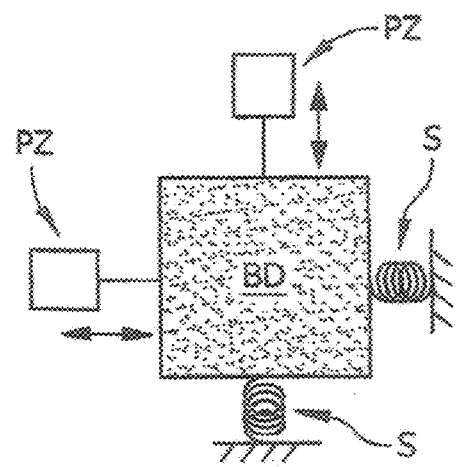

FIGS. 8b-8f show other various Speckle Reducers. FIG. 8b shows a Beam Diffuser Plate with an Input Beam (BI) entering thereinto, and exiting as Diffused Beam (DBO) components. FIG. 8c a simple Fly's Eye lens (FE) which causes a similar effect as does the Beam Diffuser in FIG. 8b when a beam is passed therethrough. FIG. 8d shows the Beam Diffuser (BD) of FIG. 8b attached to a Motor (M) that causes it to rotate in use. An Input Beam (B) is again passed therethrough as shown, and emerges as a Diffused Beam (DBO). FIG. 8e shows a Beam Diffuser (BD) Plate, again as in FIG. 8b, attached to Piezoelectric Drivers (PZ) that are applied to cause the Beam Diffuser (BD) to vibrate vertically and/or horizontally in use. The Fly's Eye (FE) Lens can also be used in the configurations of FIGS. 8d and 8e. FIG. 8f shows an end-on view of a Multimodal Fiber. Note Core region 1 and Outer region 2. In a Multimode Fiber region 1 is a significant portion of region 2. The Region 1 Core is much less prominant in a Single Mode Fiber.

Figure 9A:
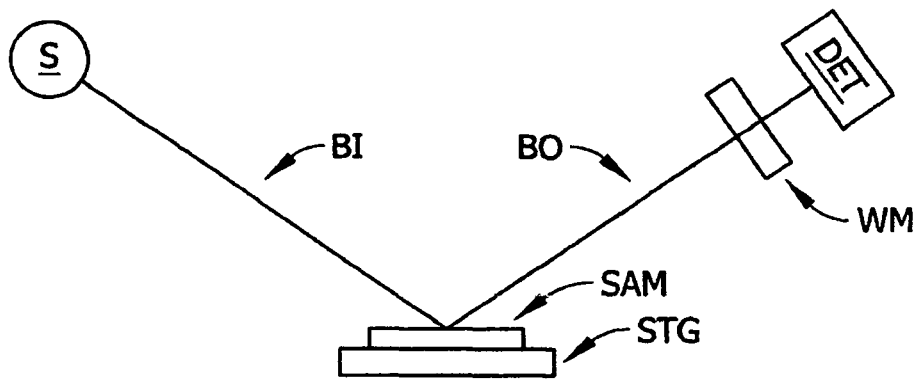
FIGS. 9a and 9b are included to show a basic reflectometer or spectrophotometer system, and a basic ellipsometer of polarimeter system, respectively, including Wavelength Modifiers (WM).

FIG. 9a is included to show a basic reflectometer or spectrophotometer system comprising:
a) a source (S) of a beam of electromagnetic radiation;
b) a stage (STG) for supporting a sample (SAM);
c) a detector system (DET) of electromagnetism;
said system being distinguished, in the present invention, in that said source (S) of a spectroscopic beam of electromagnetic radiation is a supercontinuum laser that provides an output spectrum as shown FIGS. 7a and preferably 7b. That is, a primary distinguishing aspect of the present invention is the use of a high intensity, highly directional supercontinuum laser to provide electromagnetic radiation. As described earlier with respect to FIG. 2, another aspect of the present invention involves use of detector systems that provide wavelengths of various ranges to detectors that are well suited to detecting said wavelengths.

Figure 9B:
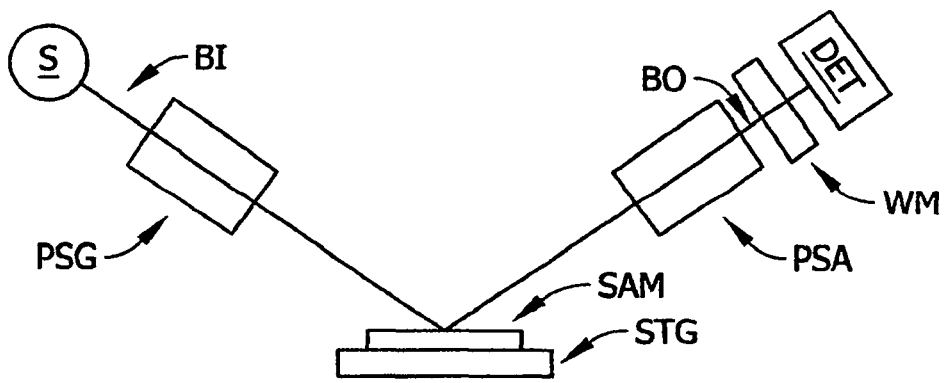

FIG. 9b shows the elements of FIG. 9a with polarization state generator (PSG) and polarization state analyzer (PSA) added, to effect an ellipsometer or polarimeter system.

(Note, where more than one Source (S) is spoken of in this Specification and the Claims, the indication of (S) in any relevant Figure is to be interpreted to represent the one in use).

Figure 9C:
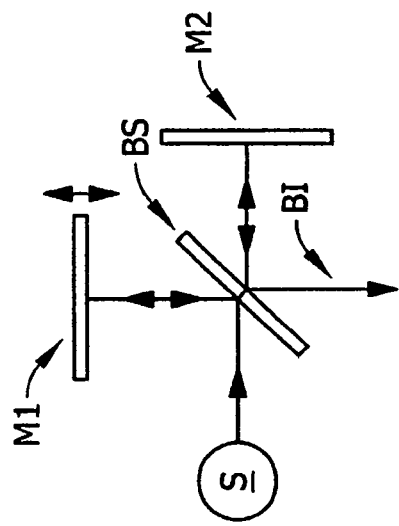
FIG. 9c shows a basic FTIR system which includes a Source of electromagnetic radiation therein.
Figure 9E:
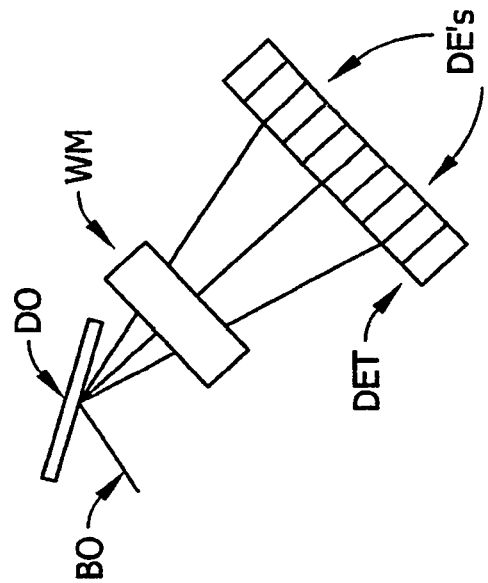
FIGS. 9d and 9e show FIGS. 9a and 9b with dispersal optics and Wavelength Modifiers (WM).
Figure 9D:
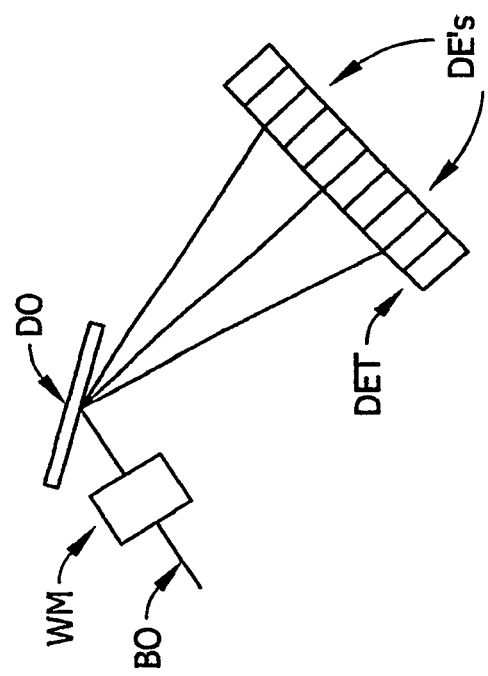

It is to be understood that the Detector Systems in the forgoing can provide that there be a plurality of Multiple Element arrays be present as in FIG. 2, or that there be a Single Array as in FIG. 4 or a Single Detector as indicated by FIGS. 9a and 9b. FIGS. 9d and 9e show the Detector side of the systems shown in FIGS. 9a and 9b modified to include Detector (DET) Array Elements (DE's). Note that in FIG. 9e the Wave Modifier (WM) is moved from before a Dispersive Optics (DO) to thereafter. In any configuration the Functional Element(s) that provide a measurable electric signal can be Solid State (eg. a CCD Array), or Single Elements, such as a Golay Cell or Bolometer. The later Detectors can be applied in monitoring Infrared and Terahertz Frequency Electromagnetic Radiation. A Golay Cell converts a Temperature change resulting from electromagnetic radiation into an electrically monitorable signal. For instance a distortable diaphragm/film can be present that reflects electromagnetic radiation into one or another Photo Cells. A distortion in the shape of diaphragm/film in a chamber of a Golay Cell effects electromagnetic radiation directing into a monitoring Photo Cell. A Bolometer operates by converting changes in electric resistance resulting from impinging electromagnetic radiation onto a blackened material. Further, Detectors can include Wavelength Modifiers where applicable, which Wavelength Modifiers serve to change Far Infrared into Near Infrared frequencies/wavelengths, so that less expensive and easier to use Silicon based elements can be used. FIGS. 9a, 9b 9d and 9e identify the Wavelength Modifiers (WM). An example of an Wavelength Modifier that converts longer wavelength to shorter wavelengths is NLIR Nonlinear Infrared Sensors which change Mid-IR Wavelengths to Near Visible Wavelengths. FIG. 9c is included to indicate that the Source (S) of electromagnetic radiation can be part of a Fourier Transform Interferometer (FTIR) system. Shown are the Source (S), a Beam Splitter (BS) and two Mirrors (M1) and (M2). In use Mirror M1 is caused to move up and down as shown. This increases and decreases the path length of the beam from Beam Splitter (BS) thereto. Various wavelengths transmit and are blocked at different positions of Mirror (M1) because of Interference at the Beam Splitter, between the beams between the Beam Splitter (BS) and Mirror (M1) and between the Beam Splitter (BS) and Mirror (M2).

Figure 10A:
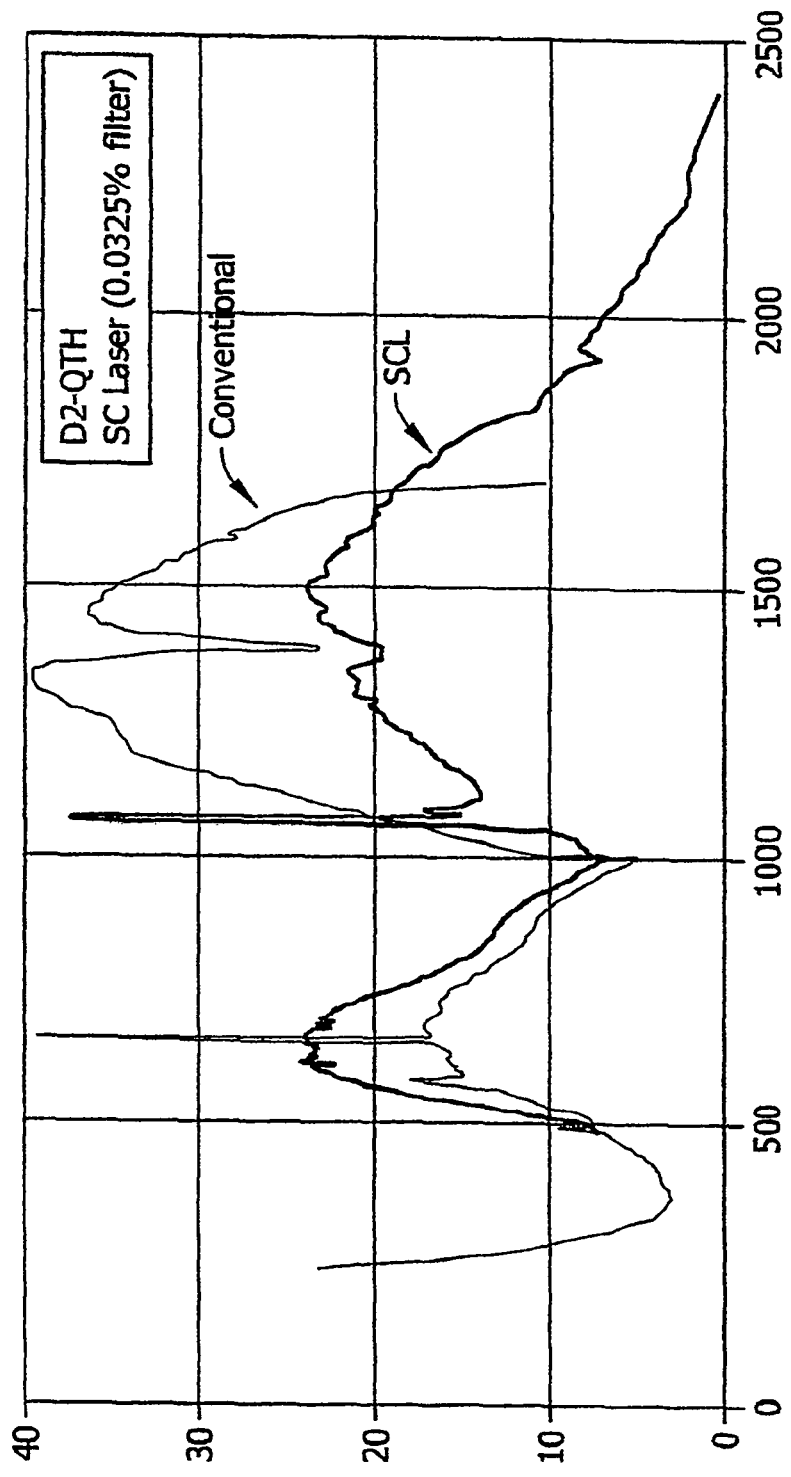
FIG. 10a is included to show a typical Inventor generated Intensity vs. Wavelength result from a supercontinuum laser, as compared to a typical conventional source of electromagnetic radiation intensity vs. Wavelength.

FIG. 10a is included to show a typical Inventor of the present invention generated Intensity vs. Wavelength result from a supercontinuum laser when a 0.0325% neutral density filter is present in the path of the supercontinuum laser beam, as compared to a conventional source of electromagnetic radiation intensity vs. Wavelength. Note, the Supercontinuum Laser intensity is very much greater than that of the Conventional Source Spectrum, (shown as about thirty times greater), and to compare their wavelength spectrum characteristics it was necessary that it be greatly attenuated by a 0.0325 neutral density filter.

Figure 10B:
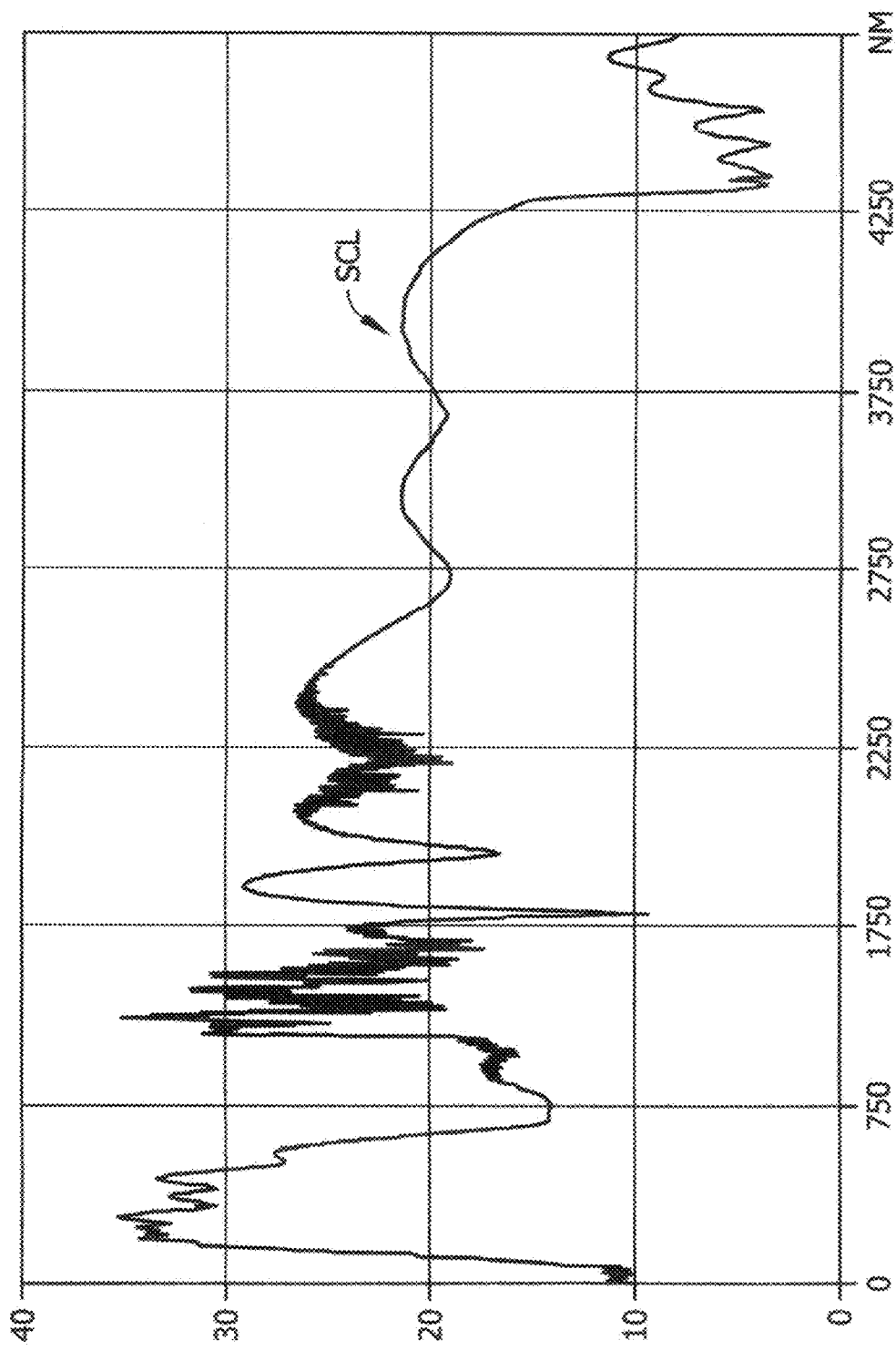
FIG. 10b is included to show that recent advances have extended the range of supercontinuum lasers to at least 4400 nm, and even up as high as 18000 nm.

FIG. 10b is included to show that progress in Supercontinuum Laser Sources has been made since Parent Applications were filed. Note the greatly expanded Wavelength Range in FIG. 10b as compared to FIG. 10a. It is expected further Wavelength Range expansion will continue and the present invention should be considered in that light. That is the Super Continuum Laser Source Wavelength Ranges shown in FIGS. 10a and 10b are exemplary, not limiting. For instance, Supercontinuum Lasers which provide wavelengths up to 18000 nm are available, though the Intensity at longer wavelengths decreases.

It is noted that a Polarizer (P), Analyzer (A) or Comensator(s) (C), (as in FIG. 6 or incorporated onto a Polarization Stste Generator (SG) or Polarization Stste Analyzer (PSA) as in FIG. 9b), can be, in use, stationary, or some or all can be caused to rotate.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

We claim:

1. A sample investigation system selected from the group consisting of:
   a reflectometer;
   a spectrophotometer;
   an ellipsometer; and
   a polarimeter;
comprising:
   a) a source of a spectroscopic beam of electromagnetic radiation;
   b) a stage for supporting a sample; and
   c) a detector system for monitoring electromagnetic radiation provided from a single sample;
said system being distinguished in that:
said source of a spectroscopic beam of electromagnetic radiation is a supercontinuum laser that provides a high intensity, highly directional coherent spectrum of electromagnetic radiation wavelengths within a range comprising 400 to at least 4400 nm, that results from interaction of a pulsed laser and non-linear processes to cause extensive spectral broadening; and
said sample investigation system further comprising a speckle reducer; said speckle reducer serving to reduce wild swings in intensity of electromagnetic radiation as a function of time and position in a beam, resulting from interference effects between different coherent wavelengths in said extensively broadened spectrum;
and in that said sample investigation system is characterized by at least one selection from the group consisting of:
   in use, said source of a spectroscopic beam of electromagnetic radiation directs a beam provided thereby to a sample placed on said stage for supporting a sample, at an angle thereto, but does not involve said beam passing through a combination beam splitter and objective lens, in that order;
   in use, fluorescence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined; and
   in use said system does not utilize a supercontinuum source comprised of a pulsed laser adapted to pump into a photonic crystal fiber made from chalogenide glasses as a substantial element; or from a pumping $CO_2$ laser adapted to fire into a photonic crystal fiber formed in part from at least one selection from the group of: $AlCl_xBr(1-x)$, NaCl and ZnSe; or a system comprising a Titanium:Saphire laser adapted to fire femtosecond pulses through a non-linear optical element disposed in an inert gas in a gas containment cell, such that a second harmonic pulse is produced and generates supercontinuum terahertz radiation.

2. A system as in claim 1, in which said sample investigation system further comprises a polarization state generator between said source of a beam of electromagnetic radiation and said stage for supporting a sample, and a polarization state analyzer between said stage for supporting a sample and said detector, and the system is an ellipsometer or polarimeter, and optionally further comprises a compensator in the polarization state generator and/or said polarization state detector.

3. A system as in claim 1, in which said sample investigation system speckle reducer is a multimode fiber.

4. A system as in claim 1, in which said sample investigation system speckle reducer is a beam diffuser.

5. A system as in claim 1, in which said sample investigation system speckle reducer is a fly's-eye beam homogenizer.

6. A system as in claim 1, in which said sample investigation system speckle reducer is a rotating beam diffuser.

7. A system as in claim 1, in which said sample investigation system speckle reducer is a piezoelectric electric crystal driven beam diffuser.

8. A system as in claim 1, in which said sample investigation system speckle reducer is an electronic means to shorten temporal coherence length.

9. A system as in claim 1, in which said sample investigation system further comprises at least one selection from the group consisting of:
   said system further comprises a Michelson interferometer and said supercontinuum laser source of electromagnetic radiation is in functional combination therewith, said source being an FTIR source;
   said system further comprises a wavelength modifier for accepting electromagnetism of relatively long (short) wavelengths, and providing output of shorter (longer) wavelengths which detector element(s) can detect;
   said detector system comprises a single element;
   said detector system comprises a multiplicity of detector elements which can detect wavelengths exiting from said wavelength modifier when relatively longer (shorter) wavelengths are entered thereinto, and in which said detectable wavelengths are guided into said detector elements via at least one selection the group consisting of:
      at least one beam splitter;
      at least one combined dichroic mirror and prism; and
      at least one grating; and
   said system further comprises a second source that provides wavelengths within a range longer or shorter than that provided by said supercontinuum laser.

10. A system as in claim 1, in which selections at least two selections are made from the group consisting of:

in use, said source of a spectroscopic beam of electromagnetic radiation directs a beam provided thereby to a sample placed on said stage for supporting a sample, at an angle thereto, but does not involve said beam passing through a combination beam splitter and objective lens, in that order;

in use, fluorescence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined; and in use does not utilize a Supercontinuum Source comprised of a pulsed laser adapted to pump into a photonic crystal fiber made from chalogenide glasses as a substantial element; or from a pumping CO2 laser adapted to fire into a photonic crystal fiber formed in part from at least one selection from the group of: AlClxBr(1-x), NaCl and ZnSe; or a system comprising a Titanium: Saphire laser adapted to fire femtosecond pulses through a non-linear optical element disposed in an inert gas in a gas containment cell, such that a second harmonic pulse is produced and generates supercontinuum terahertz radiation.

11. A system as in claim 1, in which selections all three selections are made from the group consisting of:

in use, said source of a spectroscopic beam of electromagnetic radiation directs a beam provided thereby to a sample placed on said stage for supporting a sample, at an angle thereto, but does not involve said beam passing through a combination beam splitter and objective lens, in that order;

in use, fluorescence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined; and in use does not utilize a Supercontinuum Source comprised of a pulsed laser adapted to pump into a photonic crystal fiber made from chalogenide glasses as a substantial element; or from a pumping CO2 laser adapted to fire into a photonic crystal fiber formed in part from at least one selection from the group of: AlClxBr(1-x), NaCl and ZnSe; or a system comprising a Titanium: Saphire laser adapted to fire femtosecond pulses through a non-linear, optical element disposed in an inert gas in a gas containment cell, such that a second harmonic pulse is produced and generates supercontinuum terahertz radiation.

12. A system as in claim 1, in which the detector system is comprised of a selection from the group consisting of:
a Golay cell;
a Bolometer;
a thermocouple;
is comprised of photoconductive material;
is comprised of photovoltaic material;
is comprised of Deuterated Triglycine Sulfate (DTGS);
is comprised of HgCdTe (MCT);
is comprised of $LiTaO_3$;
is comprised of PbSe;
is comprised of PbS; and
is comprised of InSb;

said group further comprising:
said detector system comprises a multiplicity of detector elements which can detect wavelengths guided thereinto into via at least one selection the group consisting of:
at least one beam splitter;
at least one combined dichroic mirror and prism; and
at least one grating.

13. A sample investigation system as in claim 1, in which at least one selection from the group of:
the supercontinuum laser source of electromagnetic radiation is in functional combination with a Michelson interferometer; and said detector is selected from the group consisting of:
a Golay cell;
a Bolometer;
a thermocouple;
a detector characterized by comprising a material selected from the group consisting of:
Deuterated Triglycine Sulfate (DTGS);
HgCdTe (MCT);
$LiTaO_3$;
PbSe;
PbS;
InSb; and
InGaAs.

14. A method of investigating a sample, said the method being:
a) providing a sample investigation system selected from the group consisting of:
a reflectometer;
a spectrophotometer;
an ellipsometer; and
a polarimeter;
comprising:
a') a source of a beam of a spectroscopic beam of electromagnetic radiation;
b') a stage for supporting a sample; and c') a detector system for monitoring electromagnetic radiation provided from a single sample;

said system being distinguished in that said source of a high intensity, highly directional spectroscopic beam of electromagnetic radiation is a supercontinuum laser that provides a coherent spectrum of electromagnetic radiation wavelengths within a range comprising 400 to at least 4400 nm, that results from interaction of a pulsed laser and non-linear processes to cause extensive spectral broadening, said system further comprising a second source that provides wavelengths within a range longer or shorter than that provided by said supercontinuum laser, said system being configured so that both sources provide electromagnetic radiation to substantially the same location on said sample as said supercontinuum source;

said system further comprising a speckle reducer in the form of a selection from the group consisting of:
  a multimode fiber;
  a beam diffuser;
  a fly's-eye beam homogenizer;
  a rotating beam diffuser;
  a piezoelectric electric crystal driven beam diffuser;
  an electronic means to shorten temporal coherence length;

said speckle reducer serving to reduce wild swings in intensity of electromagnetic radiation as a function of position in a beam resulting from interference effects between different coherent wavelengths in said extensively broadened spectrum;

and in that said sample investigation system is characterized by:
  in use, said source of a spectroscopic beam of electromagnetic radiation directs a beam provided thereby to a sample placed on said stage for supporting a sample, at an angle thereto, but does not involve said beam passing through a combination beam splitter and objective lens, in that order;
  in use, fluorescence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined; and
  in use does not utilize a Supercontinuum Source comprised of a pulsed laser adapted to pump into a photonic crystal fiber made from chalogenide glasses as a substantial element; or
  from a pumping CO2 laser adapted to fire into a photonic crystal fiber formed in part from at least one selection from the group of: AlClxBr(1-x), NaCl and ZnSe; or a system comprising a Titanium:Saphire laser adapted to fire femtosecond pulses through a non-linear optical element disposed in an inert gas in a gas containment cell, such that a second harmonic pulse is produced and generates supercontinuum terahertz radiation;

b) causing a spectroscopic beam of speckle reduced electromagnetic radiation provided by said supercontinuum laser and speckle reducer to interact with a sample on said stage, then enter said detector system and/or causing electromagnetic radiation provided by said second source interact with a sample on said stage and enter said detector;

c) analyzing data provided by said detector to characterize said sample.

15. A method as in claim 14 in which said detector comprises a system of at least two detectors and means for distributing a portion of said spectroscopic beam to each based on wavelength.

16. A system as in claim 14, in which the detector system is comprised of a selection from the group consisting of:
  a Golay cell;
  a Bolometer;
  a thermocouple;
  is comprised of photoconductive material;
  is comprised of photovoltaic material;
  is comprised of Deuterated Triglycine Sulfate (DTGS);
  is comprised of HgCdTe (MCT);
  is comprised of $LiTaO_3$;
  is comprised of PbSe;
  is comprised of PbS; and
  is comprised of InSb;
said group further comprising:
  said detector system comprises a multiplicity of detector elements which can detect wavelengths guided thereinto into via at least one selection the group consisting of:
    at least one beam splitter;
    at least one combined dichroic mirror and prism; and
    at least one grating.

17. A method as in claim 14, in which the step of providing a sample investigation system further comprises providing at least one selection from the group of:
  the supercontinuum laser source of electromagnetic radiation is in functional combination with a Michelson interferometer; and said detector is selected from the group consisting of:
    a Golay cell;
    a Bolometer;
    a thermocouple;
    a detector characterized by comprising a material selected from the group consisting of:
      Deuterated Triglycine Sulfate (DTGS);
      HgCdTe (MCT);
      $LiTaO_3$;
      PbSe;
      PbS;
      InSb; and
      InGaAs.

18. A sample investigation system selected from the group consisting of:
  a reflectometer;
  a spectrophotometer;
  an ellipsometer; and
  a polarimeter;
comprising:
a) a source of a spectroscopic beam of electromagnetic radiation;
b) a stage for supporting a sample; and c) a detector system for monitoring electromagnetic radiation;

said system being distinguished in that:

said source of a spectroscopic beam of electromagnetic radiation is a supercontinuum laser that provides a high intensity, highly directional coherent spectrum of electromagnetic radiation wavelengths within a range comprising 400 to at least 4400 nm, that results from interaction of a pulsed laser and non-linear processes to cause extensive spectral broadening, said system further comprising a second source that provides wavelengths within a range longer or shorter than that provided by said supercontinuum laser, said system being configured so that both sources provide electromagnetic radiation to substantially the same location on said sample as said supercontinuum source;

and in that said sample investigation system is characterized by:

in use, said source(s) of a spectroscopic beam of electromagnetic radiation directs a beam provided thereby to a sample placed on said stage for supporting a sample, at an angle thereto, but does not involve said beam passing through a combination beam splitter and objective lens, in that order;

in use, fluorescence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined; and in use does not utilize a Supercontinuum Source comprised of a pulsed laser adapted to pump into a photonic crystal fiber made from chalogenide glasses as a substantial element; or from a pumping CO2 laser adapted to fire into a photonic crystal fiber formed in part from at least one selection from the group of: AlClxBr(1-x), NaCl and ZnSe; or a system comprising a Titanium: Saphire laser adapted to fire femtosecond pulses through a non-linear optical element disposed in an inert gas in a gas containment cell, such that a second harmonic pulse is produced and generates supercontinuum terahertz radiation;

said system further comprising a speckle reducer in the form of a selection from the group consisting of:
 a multimode fiber;
 a beam diffuser;
 a fly's-eye beam homogenizer;
 a rotating beam diffuser;
 a piezoelectric electric crystal driven beam diffuser;
 an electronic means to shorten temporal coherence length;

said speckle reducer serving to reduce wild swings in intensity of electromagnetic radiation as a function of time and position in a beam, resulting from interference effects between different coherent wavelengths in said extensively broadened spectrum;

said system also further comprising a polarization state generator between said source of a beam of electromagnetic radiation and said stage for supporting a sample, and a polarization state analyzer between said stage for supporting a sample and said detector, and the system is an ellipsometer or polarimeter, said system optionally further comprising a compensator in the polarization state generator and/or said polarization store detector.

19. A system as in claim 18, in which said sample investigation system comprises a speckle reducer in the form of a multimode fiber.

20. A system as in claim 18, in which said sample investigation system comprises a speckle reducer in the form of a beam diffuser.

21. A system as in claim 18, in which said sample investigation system comprises a speckle reducer in the form of a fly's-eye beam homogenizer.

22. A system as in claim 18, in which said sample investigation system comprises a speckle reducer in the form of a rotating beam diffuser.

23. A system as in claim 18, in which said sample investigation system comprises a speckle reducer in the form of a piezoelectric electric crystal driven beam diffuser.

24. A system as in claim 18, in which said sample investigation system comprises a speckle reducer in the form of an electronic means to shorten temporal coherence length.

25. A system as in claim 18, in which the detector system is comprised of a selection from the group consisting of:
 a Golay cell;
 a Bolometer;
 a thermocouple;
 a detector characterized by comprising a material selected from the group consisting of:
  Deuterated Triglycine Sulfate (DTGS);
  HgCdTe (MCT);
  $LiTaO_3$;
  PbSe;
  PbS;
  InSb;
  InSb; and
 a multielement detector;
said group further comprising:
 said detector system comprises a multiplicity of detector elements which can detect wavelengths guided thereinto into via at least one selection the group consisting of:
  at least one beam splitter;
  at least one combined dichroic mirror and prism; and
  at least one grating.

26. A sample investigation system as in claim 18, in which is made at least one selection from the group of:
 the supercontinuum laser source of electromagnetic radiation is in functional combination with a Michelson interferometer; and said detector is selected from the group consisting of:
  a Golay cell;
  a Bolometer;
  a thermocouple;
  a detector characterized by comprising a material selected from the group consisting of:
   Deuterated Triglycine Sulfate (DTGS);
   HgCdTe (MCT);

LiTaO$_3$;
PbSe;
PbS;
InSb; and
InGaAs.

27. A sample investigation system for use in investigating samples over a wavelength range comprising between 400 nm up to at least 50000 nm, said sample investigation system being selected from the group consisting of:
  a reflectometer;
  a spectrophotometer;
  an ellipsometer; and
  a polarimeter;
and comprising:
  a) a source of a spectroscopic beam of electromagnetic radiation;
  b) a stage for supporting a sample; and
  c) at least one detector system for monitoring electromagnetic radiation;
said source of a spectroscopic beam of electromagnetic radiation being selected from the group consisting of:
  a supercontinuum laser;
  a Nernst Glower;
  a Globar;
  a laser stabilized arc lamp;
  a HG arc lamp; and
  a fixed or tunable quantum cascade laser; and
which provide wavelengths in the infrared and/or terahertz ranges;
said at least one detector system comprising detector element(s) which are incapable of detecting long electromagnetic radiation wavelengths over at least part of the infrared and terahertz ranges;
said sample investigation system further comprising at least one wavelength modifier which, in use, accepts relatively long (short) wavelength electromagnetic radiation which the element(s) in said at least one detector system are incapable of detecting, and providing as output shorter (longer) wavelengths which said detector element(s) are capable of detecting, and entering said detectable wavelengths into said at least one detector system comprised of element(s) which can detect said shorter (longer) wavelength electromagnetic radiation.

28. A method as in claim 27, in which the step of providing a sample investigation system further comprises providing at least one selection from the group of:
  the supercontinuum laser source of electromagnetic radiation is in functional combination with a Michelson interferometer; and said detector is selected from the group consisting of:
  a Golay cell;
  Bolometer;
  a thermocouple;
  a detector characterized by comprising a material selected from the group consisting of:
    Deuterated Triglycine Sulfate (DTGS);
    HgCdTe (MCT);
    LiTaO$_3$;
    PbSe;
    PbS;
    InSb; and
    InGaAs.

29. A method of investigating a sample comprising the steps of:
  a) providing a sample investigation system for use in investigating samples over a wavelength range comprising between 400 nm to at least 50000 nm, said sample investigation system being selected from the group consisting of:
    a reflectometer;
    a spectrophotometer;
    an ellipsometer; and
    a polarimeter;
  and comprising:
    a') a source of a spectroscopic beam of electromagnetic radiation;
    b') a stage for supporting a sample; and
    c') at least one detector system for monitoring electromagnetic radiation;
  said source of a spectroscopic beam of electromagnetic radiation being selected from the group consisting of:
    a supercontinuum laser;
    a Nernst Glower;
    a Globar;
    a laser stabilized arc lamp;
    a HG arc lamp; and
    a fixed or tunable quantum cascade laser;
  which provide wavelengths in the infrared and/or terahertz ranges;
  said at least one detector system comprising detector element(s) which are incapable of detecting long electromagnetic radiation wavelengths over at least part of the infrared and terahertz ranges;
  said sample investigation system further comprising at least one wavelength modifier which, in use, accepts relatively long (short) wavelength electromagnetic radiation which the element(s) in said at least one detector system element(s) are incapable of detecting, and providing as output shorter (longer) wavelengths which said detector element(s) are capable of detecting, and entering said detectable wavelengths into said at least one detector system comprised of detector element(s) which can detect said shorter (longer) wavelength electromagnetic radiation;
  b) selecting the supercontinuum laser source and further providing a speckle reducing system selected from the group consisting of:
    a multimode fiber;
    a beam diffuser;
    a fly's-eye beam homogenizer;
    a rotating beam diffuser;
    a piezoelectric electric crystal driven beam diffuser; and
    an electronic means to shorten temporal coherence length;
  c) placing a sample to be investigated onto said stage for supporting a sample;
  d) causing a beam of electromagnetic radiation to be produced by said supercontinuum laser source and interact with said sample, then enter said at least one detector system for monitoring electromagnetic radiation;
  causing said beam of electromagnetic radiation to also interact with said speckle reducing system and said wavelength modifier between said supercontinuum laser source and said at least one detector system comprising element(s) which are incapable of detecting long (short) electromagnetic radiation wavelengths over at least part of the infrared and terahertz ranges;
  such that electromagnetic radiation of wavelength(s) which the element(s) in said at least one detector can detect are entered into said at least one detector system; and
  e) analyzing output from said at least one detector to provide insight to characteristics of said sample.

30. A method as in claim 29, in which the step of providing a sample investigation system further comprises providing at least one selection from the group of:
the supercontinuum laser source of electromagnetic radiation is in functional combination with a Michelson interferometer; and said detector is selected from the group consisting of:
a Golay cell;
a Bolometer;
a thermocouple;
a detector characterized by comprising a material selected from the group consisting of:
Deuterated Triglycine Sulfate (DTGS);
HgCdTe (MCT);
LiTaO$_3$;
PbSe;
PbS;
InSb; and
InGaAs.

31. A method of investigating a sample comprising the steps of:
a) providing a sample investigation system for use in investigating samples over a wavelength range comprising between 400 nm up to at least 50000 nm, said sample investigation system being selected from the group consisting of:
a reflectometer;
a spectrophotometer;
an ellipsometer; and
a polarimeter;
and comprising:
a') a source of a spectroscopic beam of electromagnetic radiation;
b') a stage for supporting a sample; and
c') at least one detector system for monitoring electromagnetic radiation;
said source of a spectroscopic beam of electromagnetic radiation being selected from the group consisting of:
a supercontinuum laser;
a Nernst Glower;
a Globar;
a laser stabilized arc lamp;
a HG arc lamp; and
a fixed or tunable quantum cascade laser;
which provide wavelengths in the infrared and/or terahertz ranges;
said at least one detector system comprising detector element(s) which are incapable of detecting electromagnetic radiation wavelengths over at least part of the infrared and terahertz ranges;
said sample investigation system further comprising at least one wavelength modifier which, in use, accepts relatively long (short) wavelength electromagnetic radiation which the detector element(s) in said at least one detector system are incapable of detecting, and providing as output shorter (longer) wavelengths which said detector element(s) are capable of detecting, and entering said detectable wavelengths into said at least one detector system comprised of element(s) which can detect said shorter wavelength electromagnetic radiation;
b) selecting other than the supercontinuum laser source of electromagnetic radiation;
c) placing a sample to be investigated onto said stage for supporting a sample;
d) causing a beam of electromagnetic radiation to be produced by said source and interact with said sample, then enter said at least one detector system for monitoring electromagnetic radiation;
causing said beam of electromagnetic radiation to also interact with said wavelength modifier between said source and said at least one detector system comprising detector element(s) which are incapable of detecting long (short) electromagnetic radiation wavelengths over at least part of the infrared and terahertz ranges;
such that electromagnetic radiation of wavelength(s) which the detector element(s) in said at least one detector can detect are entered into said at least one detector system; and
e) analyzing output from said at least one detector to provide insight to characteristics of said sample.

32. A sample investigation system for use in investigating samples over a wavelength range, said sample investigation system being selected from the group consisting of:
a reflectometer;
a spectrophotometer;
an ellipsometer; and
a polarimeter;
comprising:
a) a source of a beam of a spectroscopic beam of electromagnetic radiation selected from the group consisting of:
a supercontinuum laser; and
a source for providing wavelengths longer or shorter than provided by said supercontinuum laser;
b) a stage for supporting a sample; and
c) a detector system for monitoring electromagnetic radiation provided from a single sample;
said at least one detector system comprising detector element(s) which are incapable of detecting long (short) electromagnetic radiation wavelengths over at least part of the source provided range of wavelengths;
said system further comprising at least one selection from the group consisting of:
at least one wavelength modifier which, in use, accepts relatively long (short) wavelength electromagnetic radiation which the element(s) in said at least one detector system are incapable of detecting and providing as output shorter (longer) wavelengths which said detector element(s) can detect, the output of which wavelength modifier is entered as detectable wavelengths into said detector system detector element(s); and
a speckle reducer, said speckle reducer serving to reduce wild swings in intensity of electromagnetic radiation as a function of time and position in a beam, resulting from interference effects between different coherent wavelengths in said extensively broadened spectrum.

33. A system as in claim 32, wherein said source of a spectroscopic beam of electromagnetic wavelengths provide wavelengths in the infrared and/or terahertz ranges, and the detector element(s) are incapable of detecting them, but wherein a wavelength modifier is selected and the detector can detect the modified wavelengths provided from therefrom.

34. A sample investigation system selected from the group consisting of:
a reflectometer;
a spectrophotometer;
an ellipsometer; and
a polarimeter;
comprising:
a) a source of a beam of a spectroscopic beam of electromagnetic radiation;
b) a stage for supporting a sample; and c) a detector system for monitoring electromagnetic radiation provided from a single sample;
said system being distinguished in that said source of a high intensity, highly directional spectroscopic beam of electromagnetic radiation is supercontinuum laser that provides a coherent spectrum of electromagnetic radiation wavelengths within a range comprising 40.0 to at least 4400 nm, that results from interaction of a pulsed laser and non-linear processes to cause extensive spectral broadening;
said system further comprising Michelson interferometer and said selected source of electromagnetic radiation is in functional combination therewith, said combination being an FTIR source;
said detector system comprising a single element detector; and
said system further comprising a speckle reducer, said speckle reducer serving to reduce wild swings in intensity of electromagnetic radiation as a function of position in a beam resulting from interference effects between different coherent wavelengths in said extensively broadened spectrum.

35. A sample investigation system as in claim 34, in which said speckle reducer is selected from the group consisting of:
   a multimode fiber;
   a beam diffuser;
   a fly's-eye beam homogenizer;
   a rotating beam diffuser;
   a piezoelectric electric crystal driven beam diffuser; and
   an electronic means to shorten temporal coherence length.

36. A sample investigation system as in claim 34, in which said detector single detector element is characterized by comprising a material selected from the group consisting of:
   Deuterated Triglycine Sulfate (DIGS);
   HgCdTe (MCT);
   LiTaO$_3$;
   PbSe;
   PbS; and
   InSb.

37. A sample investigation system selected from the group consisting of:
   a reflectometer;
   a spectrophotometer;
   an ellipsometer; and
   a polarimeter;
comprising:
   a) a source of a beam of a spectroscopic beam of electromagnetic radiation;
   b) a stage for supporting a sample; and
   c) a detector system for monitoring electromagnetic radiation provided from a single sample;
said source of a beam of electromagnetic radiation being a selection from the group consisting of:
   a supercontinuum laser that provides a coherent spectrum of electromagnetic radiation wavelengths within a range comprising 400 to at least 4400 nm, that results from interaction of a pulsed laser and non-linear processes to cause extensive spectral broadening said system further comprises a Michelson interferometer and said selected source of electromagnetic radiation is in functional combination therewith, said combination being an FTIR source;
said sample investigation system further comprising a speckle reducer; said speckle reducer serving to reduce wild swings in intensity of electromagnetic radiation as a function of time and position in a beam, resulting from interference effects between different coherent wavelengths in said extensively broadened spectrum;
said detector system comprising a single element detector characterized by comprising a material selected from the group consisting of:
   Deuterated Triglycine Sulfate (DTGS);
   HgCdTe (MCT);
   LiTaO$_3$;
   PbSe;
   PbS; and
   InSb.

38. A sample investigation system as in claim 34, which is further characterized by at least one selection from the group consisting of:
   in use, said source of a spectroscopic beam of electromagnetic radiation directs a beam provided thereby to a sample placed on said stage for supporting a sample, at an angle thereto, but does not involve said beam passing through a combination beam splitter and objective lens, in that order;
   in use, fluoresence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined; and
   in use said system does not utilize a supercontinuum source comprised of a pulsed laser adapted to pump into a photonic crystal fiber made from chalogenide glasses as a substantial element; or from a pumping CO2 laser adapted to fire into a photonic crystal fiber formed in part from at least one selection from the group of: AlClxBr(1-x), NaCl and ZnSe; or a system comprising a Titanium:Saphire laser adapted to fire femtosecond pulses through a non-linear optical element disposed in an inert gas in a gas containment cell, such that a second harmonic pulse is produced and generates supercontinuum terahertz radiation.

39. A sample investigation system as in claim 38, in which two or all three selections are made.

40. A sample investigation system as in claim 37, which is further characterized by at least one selection from the group consisting of:
   in use, said source of a spectroscopic beam of electromagnetic radiation directs a beam provided thereby to a sample placed on said stage for supporting a sample, at an angle thereto, but does not involve said beam passing through a combination beam splitter and objective lens, in that order;
   in use, fluoresence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector, do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined; and in use said system does not utilize a supercontinuum source comprised of a pulsed laser adapted to pump into a photonic crystal fiber made from chalogenide glasses as a substantial element; or from a pumping CO2 laser adapted to fire into a photonic crystal fiber formed in part from at least one selection from the group of: AlClxBr(1-x), NaCl and ZnSe; or a system comprising a Titanium:Saphire laser adapted to fire femtosecond pulses through a non-linear optical element disposed in an inert gas in a gas containment cell, such that a second harmonic pulse is produced and generates supercontinuum terahertz radiation.

41. A sample investigation system as in claim 40, in which two or all three selections are made.

42. A sample investigation system selected from the group consisting of:
   a reflectometer;
   a spectrophotometer;
   an ellipsometer; and
   a polarimeter;
comprising:
   a) a source of a spectroscopic beam of electromagnetic radiation;
   b) a stage for supporting a sample; and
   c) a detector system for monitoring electromagnetic radiation provided from a single sample;
said source and detector being oriented to provide and receive electromagnetic radiation at an oblique angle to said a sample placed on said stage;
said system being distinguished in that:
said source of a spectroscopic beam of electromagnetic radiation is a supercontinuum laser that provides a high intensity, highly directional coherent spectrum of electromagnetic radiation wavelengths within a range comprising 400 to at least 4400 nm, that results from interaction of a pulsed laser and non-linear processes to cause extensive spectral broadening; and
and in that said sample investigation system is characterized by:
   in use, said source of a spectroscopic beam of electromagnetic radiation directs a beam provided thereby to a sample placed on said stage for supporting a sample, at an angle thereto, but does not involve said beam passing through a beam splitter;
   in use, fluoresence caused to occur by an illumination beam of electromagnetic radiation is not detected by a detector for spatially resolving radiation emitted by an object to be examined, and an illumination beam path between an illumination means and an object to be examined, and a detection beam path between said object to be examined and a detector do not comprise illumination optics which are designed to generate a light sheet of illumination radiation extending transverse to the illumination beam path, and wherein the axis of the detection beam path is oriented substantially perpendicular to a section plane of light sheet and the object to be examined, and an illumination beam path between an illumination means and an object to be examined, and a detection beam path between said object to be examined and a detector do not comprise illumination optics which are designed to generate a light sheet of illumination radiation extending transverse to an axis of the illuminating beam path, and the detection beam path is not oriented at an angle diverging from θ degrees to a section plane of the light sheet and of the object to be examined; and
   in use said system does not utilize a supercontinuum source comprised of a pulsed laser adapted to pump into a photonic crystal fiber made from chalogenide glasses as a substantial element; or from a pumping CO2 laser adapted to fire into a photonic crystal fiber formed in part from at least one selection from the group of: AlClxBr(1-x), NaCl and ZnSe; or a system comprising a Titanium:Saphire laser adapted to fire femtosecond pulses through a non-linear optical element disposed in an inert gas in a gas containment cell, such that a second harmonic pulse is produced and generates supercontinuum terahertz radiation.

\* \* \* \* \*